US008565583B2

(12) United States Patent
Yamaguchi et al.

(10) Patent No.: US 8,565,583 B2
(45) Date of Patent: Oct. 22, 2013

(54) CONTENT TRANSMISSION/RECEPTION SYSTEM

(75) Inventors: Katsuhisa Yamaguchi, Osaka (JP); Koji Nakanishi, Osaka (JP)

(73) Assignee: Panasonic Corporation, Osaka (JP)

(*) Notice: Subject to any disclaimer, the term of this patent is extended or adjusted under 35 U.S.C. 154(b) by 88 days.

(21) Appl. No.: 13/390,556

(22) PCT Filed: May 31, 2011

(86) PCT No.: PCT/JP2011/003031
§ 371 (c)(1),
(2), (4) Date: Feb. 15, 2012

(87) PCT Pub. No.: WO2012/001877
PCT Pub. Date: Jan. 5, 2012

(65) Prior Publication Data
US 2012/0141093 A1 Jun. 7, 2012

(30) Foreign Application Priority Data
Jul. 1, 2010 (JP) .................................. 2010-150837

(51) Int. Cl.
H04N 5/92 (2006.01)

(52) U.S. Cl.
USPC .......................................... 386/259; 386/239

(58) Field of Classification Search
None
See application file for complete search history.

(56) References Cited

U.S. PATENT DOCUMENTS

| 2002/0025777 A1 | 2/2002 | Kawamata et al. |
| 2006/0233526 A1 | 10/2006 | Fujihata et al. |

FOREIGN PATENT DOCUMENTS

| JP | 2000-253358 | 9/2000 |
| JP | 2002-77856 | 3/2002 |
| JP | 2006-303593 | 11/2006 |
| JP | 2007-299152 | 11/2007 |
| WO | 2007/069452 | 6/2007 |

OTHER PUBLICATIONS

International Search Report issued Sep. 6, 2011 in corresponding International Application No. PCT/JP2011/003031.
Digital Transmission Licensing Administrator, "DTCP vol. 1 Supplement E Mapping DTCP to IP (Informational Version)", Revision 1.4, Dec. 12, 2011, pp. 1-50.

Primary Examiner — Huy T Nguyen
Assistant Examiner — Eileen Adams
(74) Attorney, Agent, or Firm — Wenderoth, Lind & Ponack, L.L.P.

(57) ABSTRACT

To provide a device that easily judges that content that has been edited and moved back differs from original content. A content transmission device 60 divides edited content composed of partial original content and partial edited content to generate transfer data pieces, generates a nonce value of each piece, encrypts the piece based on the nonce value, and transmits the encrypted transfer data pieces and nonce values. When switch occurs between the partial contents, the device 60 generates nonce value such that discontinuity exists between the generated nonce value and immediately previously generated nonce value. A content reception device 70 receives the encrypted transfer data pieces and nonce values, decrypts the pieces based on the nonce values, writes the transfer data pieces into recording medium. When discontinuity exists between currently received nonce value and immediately previously received nonce value, the device 70 detects reception of partial edited content.

17 Claims, 20 Drawing Sheets

CONTENT TRANSMISSION/RECEPTION SYSTEM

TECHNICAL FIELD

The present invention relates to an art of moving a content composed of video, audio, and so on from an origination device to a destination device that are connected to a network, and moving the content edited by the destination device back to the origination device.

BACKGROUND ART

Recently, there has been widespread use in homes of PCs (Personal Computers) and digital home appliances such as hard disk recorders for recording, into recording media such as HDDs (Hard Disk Drives) and BDs (Blu-ray Discs), programs broadcast via a terrestrial wave, BS (Broadcast Satellite), CS (Communication Satellite), and so on. With the development of the communication network technology and communication devices, many of these devices have a function of connecting to a communication network. This increases the spread of an environment that easily realizes remote content playback, content copy, and content move among devices in homes via the communication network. Here, the remote content playback indicates that a content recorded in a recording device is played back by a playback device that is connected to the recording device via a communication network in home.

In the case where a content is transmitted between devices in home, a predetermined protocol is used by a transmission device and a reception device.

The "content" here is, for example, data in MPEG (Moving Picture Experts Group) 2-TS (Transport Stream) format. This data contains an ES (Elementary Stream) of each of video and audio and information accompanying a content such as PSI (Program Specific Information) which have been multiplexed.

As a protocol specification for sharing a content between devices in such a home area network, the DLNA (Digital Living Network Alliance) guidelines are known, for example.

The DLNA guidelines include standards which have been selected among conventional standards and specified, in order to achieve a high interconnectivity in the home area network. The DLNA guidelines specify that, as long as packet communication can be performed via TCP/IP (Transmission Control Protocol/InternetProtocol, any method of connecting between devices may be employed regardless of whether a communication is a wired communication or a wireless communication. For example, the DLNA guidelines specify, as the wired communication and the wireless communication, connection via a wired LAN such as IEEE802.3 and a connection via a wireless LAN such as IEEE802.11a/b/g in which packet communication can be performed via TCP/IP, respectively. Furthermore, the DLNA guidelines specify UPnP (Universal Plug and Play) for definition of device discovery and control method on the home area network, and definition of search, selection, management method of a content.

Also, in order to transmit a program broadcast via a terrestrial wave, BS, CS, or the like via a protocol specified by the DLNA, there needs an art for copyright protection. As an art for protecting a path for transmitting a content that is a target of copyright protection, DTCP-IP (Digital Transmission Content Protection over Internet Protocol) has been standardized. Furthermore, in the case where a copyright of a content needs to be protected, video output needs to be performed based on copyright protection information set for each video stream section of the content in order to appropriately reflect an intention of an owner of the copyright.

Furthermore, the Dubbing 10 system permits multiple times of copies of a content to another device.

With the widespread of devices capable of dealing with contents in homes, the following usage is presumed where a user adds a content created by the user to an original content, which has been moved from a first device to a second device, or modifies the original content to create an edited content, and then moves the edited content back to the first device as the original content. Here, assume that the edited content is created by adding an advertisement content, modifying the original content into a parody content, or the like. If the edited content is distributed, especially if the edited content is distributed as the original content, rights relating to the original content of an author, a creator, and so on might be infringed. This is a problem.

Accordingly, in such a case, it is necessary to clearly distinguish between the edited content and the original content.

According to a conventional content management method, the UPnP specified by the DLNA guidelines is used for searching for a plurality of contents on a server to obtain a content list, and distinguishing between the contents based on IDs of the contents contained in the content list. However, this method is incomplete to judge whether the contents are the same content. For example, in the case where the contents are the same content but each have a different ID, the contents cannot be considered as the same content. On the contrary, there is a case where the contents have the same ID but are each a different content. Accordingly, it is difficult to judge the sameness of content only based on information of the content list obtained via the UPnP.

In order to solve this problem, Patent Literature 1 discloses a content reception device that performs comparison processing on all the pieces of stream data of an original content recorded on a server and all the pieces of stream data of a received content, thereby to judge whether the original content and the received content are the same.

CITATION LIST

Patent Literature

[Patent Literature 1] Japanese Patent Application Publication No. 2007-299152

Non-Patent Literature

[Non-Patent Literature 1] DTCP Volume 1 Supplement E Mapping DTCP to IP (Informational Version), Revision 1.3 Mar. 19, 2010

SUMMARY OF INVENTION

Technical Problem

However, according to the art disclosed in the Patent Literature 1, in order to judge whether the original content and the received content are the same, comparison processing is performed on all the pieces of data. This causes a problem of the increase in processing load of the content reception device.

In order to solve the problem, the present invention aims to provide a content transmission/reception system capable of, in the case where a content which has been moved is moved back, easily judging that the moved-back content differs from an original content with no increase in processing load thereof.

Solution to Problem

In order to solve the above problem, a content transmission/reception system that is one aspect of the present invention is a content transmission/reception system that includes a content transmission device and a content reception device, the content transmission device comprising: a storage unit operable to store therein an edited content composed of a partial original content and a partial edited content, the partial original content being a part of an original content, the partial edited content being a part obtained by editing a part of the original content; a division unit operable to divide each of the partial original content and the partial edited content to generate a plurality of pieces of transfer data; an encryption unit operable to generate a nonce value with respect to each of the pieces of transfer data, such that (i) discontinuity exists between a nonce value generated with respect to one of the pieces of transfer data and a nonce value that has been immediately previously generated, the one piece of transfer data being generated immediately after a switch between the partial original content and the partial edited content, and (ii) continuity exists between a nonce value generated with respect to each of the pieces of transfer data excepting the one piece of transfer data and a nonce value that has been immediately previously generated, generate a key based on each of the generated nonce values, and encrypt a corresponding one of the pieces of transfer data with use of the generated key, thereby to obtain a plurality of pieces of encrypted transfer data; and a transmission unit operable to transmit the pieces of encrypted transfer data together with the respective nonce values in order of generation of the pieces of encrypted transfer data, and the content reception device comprising: a reception unit operable to sequentially receive, as a content, the pieces of encrypted transfer data together with the respective nonce values; a decryption unit operable to generate a key based on each of the received nonce values, and decrypt a corresponding one of the received pieces of encrypted transfer data with use of the generated key, thereby to obtain a plurality of pieces of transfer data; a judgment unit operable to judge, with respect to each of the received nonce values, whether continuity or discontinuity exists between the received nonce value and a nonce value that has been immediately previously received; and a writing unit operable to sequentially write, as the content, the obtained pieces of transfer data into a recording medium, and when the judgment unit judges that discontinuity exists therebetween, write, into the recording medium, information indicating that the received content contains a partial edited content.

Advantageous Effects of Invention

This aspect exhibits an excellent effect that simply by making a comparison between each of the received nonce values and a nonce value that has been immediately previously received, it is possible to judge that the received content contains a partial edited content, thereby to easily judge that the received content differs from an original content.

DESCRIPTION OF EMBODIMENTS

Figure 1:
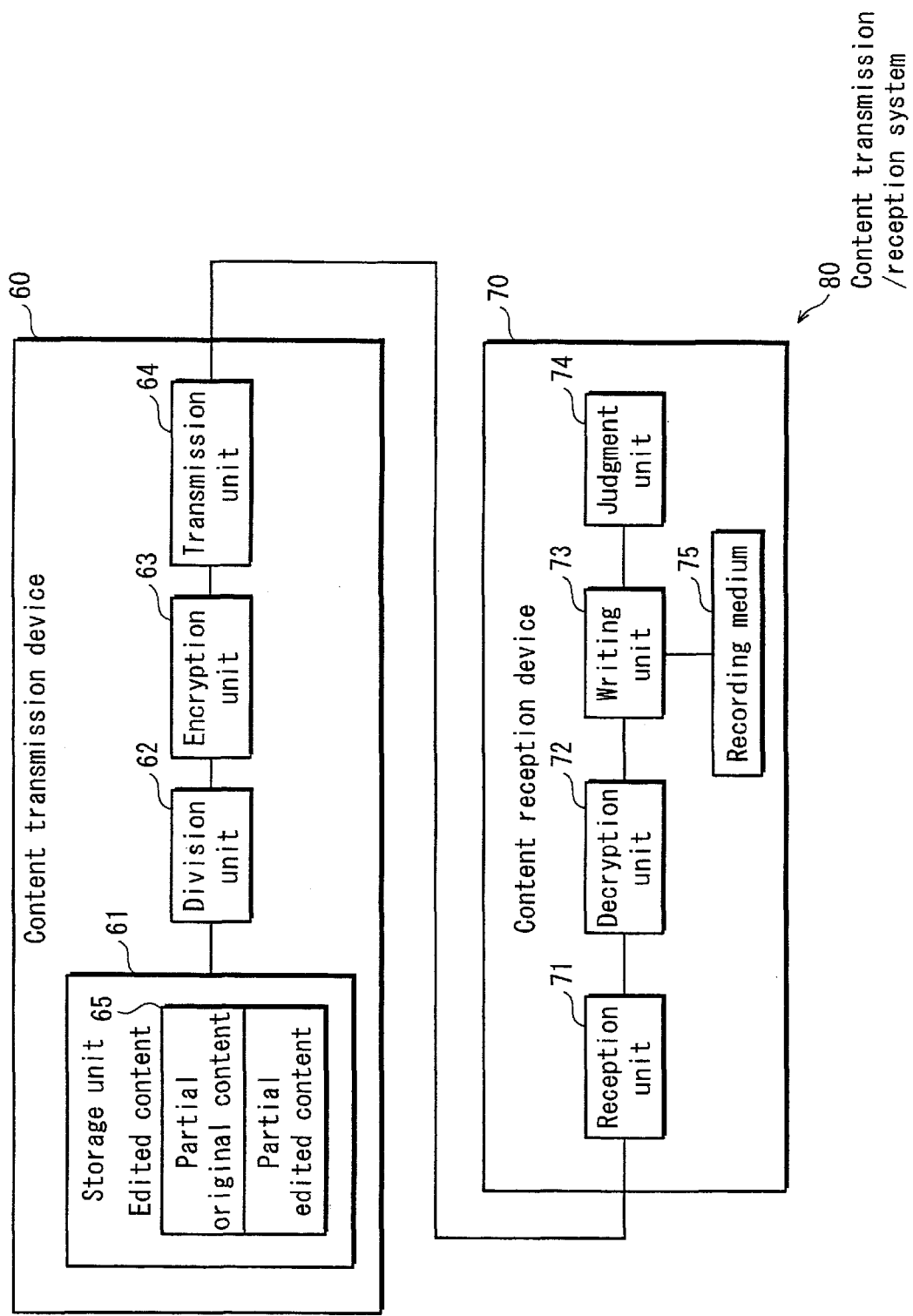
FIG. 1 shows the structure of a content transmission/reception system 80 as an embodiment 1 of the present invention.

A content transmission/reception system that is one aspect recited in claim 1 is a content transmission/reception system that includes a content transmission device and a content reception device, the content transmission device comprising: a storage unit operable to store therein an edited content composed of a partial original content and a partial edited content, the partial original content being a part of an original content, the partial edited content being a part obtained by editing a part of the original content; a division unit operable to divide each of the partial original content and the partial edited content to generate a plurality of pieces of transfer data; an encryption unit operable to generate a nonce value with respect to each of the pieces of transfer data, such that (i) discontinuity exists between a nonce value generated with respect to one of the pieces of transfer data and a nonce value that has been immediately previously generated, the one piece of transfer data being generated immediately after a switch between the partial original content and the partial edited content, and (ii) continuity exists between a nonce value generated with respect to each of the pieces of transfer data excepting the one piece of transfer data and a nonce value that has been immediately previously generated, generate a key based on each of the generated nonce values, and encrypt a corresponding one of the pieces of transfer data with use of the generated key, thereby to obtain a plurality of pieces of encrypted transfer data; and a transmission unit operable to transmit the pieces of encrypted transfer data together with the respective nonce values in order of generation of the pieces of encrypted transfer data, and the content reception device comprising: a reception unit operable to sequentially receive, as a content, the pieces of encrypted transfer data together with the respective nonce values; a decryption unit operable to generate a key based on each of the received nonce values, and decrypt a corresponding one of the received pieces of encrypted transfer data with use of the generated key, thereby to obtain a plurality of pieces of transfer data; a judgment unit operable to judge, with respect to each of the received nonce values, whether continuity or discontinuity exists between the received nonce value and a nonce value that has been immediately previously received; and a writing unit operable to sequentially write, as the content, the obtained pieces of transfer data into a recording medium, and when the judgment unit judges that discontinuity exists therebetween, write, into the recording medium, information indicating that the received content contains a partial edited content.

This aspect exhibits an excellent effect that simply by making a comparison between each of the received nonce values and a nonce value that has been immediately previously received, it is possible to judge that the received content contains a partial edited content, thereby to easily judge that the received content differs from an original content.

Also, a content transmission device that is one aspect recited in Claim 4 is a content transmission device that edits an original content which has been moved to obtain an edited content, and moves the edited content back, the content transmission device comprising: a storage unit operable to store therein an edited content composed of a partial original content and a partial edited content, the partial original content being a part of an original content, the partial edited content being a part obtained by editing a part of the original content; a division unit operable to divide each of the partial original content and the partial edited content to generate a plurality of pieces of transfer data; an encryption unit operable to generate a nonce value with respect to each of the pieces of transfer data, such that (i) discontinuity exists between a nonce value generated with respect to one of the pieces of transfer data and a nonce value that has been immediately previously generated, the one piece of transfer data being generated immediately after a switch between the partial original content and the partial edited content, and (ii) continuity exists between a nonce value generated with respect to each of the pieces of transfer data excepting the one piece of transfer data and a nonce value that has been immediately previously generated, generate a key based on each of the generated nonce values, and encrypt a corresponding one of the pieces of transfer data with use of the generated key, thereby to obtain a plurality of pieces of encrypted transfer data; and a transmission unit operable to transmit the pieces of encrypted transfer data together with the respective nonce values in order of generation of the pieces of encrypted transfer data.

According to this aspect, with respect to the one piece of transfer data generated immediately after the switch between the partial original content and the partial edited content, the content transmission device generates the nonce value such that discontinuity exists between the generated nonce value and the immediately previously generated nonce value. Accordingly, it is possible to detect that a switch has occurred between the partial original content and the partial edited content by judging that discontinuity exists between the nonce values.

Here, in an aspect recited in Claim 5, the encryption unit generates a random value as the nonce value with respect to the one piece of transfer data generated immediately after the switch.

According to this aspect, the random value is generated as the nonce value with respect to the one piece of transfer data generated immediately after the switch. Accordingly, it is possible to easily generate a nonce value such that discontinuity exists between the generated nonce value and a nonce value that has been immediately previously generated.

Here, in an aspect recited in Claim 6, the encryption unit generates the nonce value with respect to the one piece of transfer data generated immediately after the switch, such that a difference between the generated nonce value and the immediately previously generated nonce value is greater than a threshold, and the threshold is used for judging whether continuity or discontinuity exists between each of the generated nonce values and a nonce value that has been immediately previously generated.

According to this aspect, the random value is generated as the nonce value with respect to the one piece of transfer data generated immediately after the switch, such that the difference between the generated nonce value and the immediately previously generated nonce is greater than the threshold. Accordingly, it is possible to surely generate a nonce value such that discontinuity exists between the generated nonce value and a nonce value that has been immediately previously generated.

Here, in an aspect recited in Claim 7, the encryption unit generates the nonce value with respect to the one piece of transfer data generated immediately after the switch, such that a difference between the generated nonce value and the immediately previously generated nonce value is equal to or greater than a second threshold, the second threshold is greater than a first threshold, and is used for judging that discontinuity exists between each of the generated nonce values and a nonce value that has been immediately previously generated, and the first threshold is used for judging that continuity exists therebetween.

According to this aspect, the random value is generated as the nonce value with respect to the one piece of transfer data generated immediately after the switch, such that the difference between the generated nonce value and the immediately previously generated nonce is greater than the second threshold. Accordingly, it is possible to surely generate a nonce value such that discontinuity exists between the generated nonce value and a nonce value that has been immediately previously generated.

Also, a content reception device that is one aspect recited in Claim 8 is a content reception device that receives the edited content from the content transmission device of Claim 1, the content reception device comprising: a reception unit operable to sequentially receive, as a content, the pieces of encrypted transfer data together with the respective nonce values; a decryption unit operable to generate a key based on each of the received nonce values, and decrypt a corresponding one of the received pieces of encrypted transfer data with use of the generated key, thereby to obtain a plurality of pieces of transfer data; a judgment unit operable to judge, with respect to each of the received nonce values, whether continuity or discontinuity exists between the received nonce value and a nonce value that has been immediately previously received; and a writing unit operable to sequentially write, as the content, the obtained pieces of transfer data into a recording medium, and when the judgment unit judges that discontinuity exists therebetween, write, into the recording medium, information indicating that the received content contains a partial edited content.

This aspect exhibits an excellent effect that simply by making a comparison between each of the received nonce values and a nonce value that has been immediately previously received, it is possible to judge that the received content contains a partial edited content, thereby to easily judge that the received content differs from an original content.

Here, in an aspect recited in Claim 9, with respect to each of the received nonce values, if a difference between the received nonce value and a nonce value that has been immediately previously received is greater than a threshold, the judgment unit judges that discontinuity exists therebetween.

According to this aspect, when the difference between the received nonce value and the immediately previously received nonce value is greater than the threshold, the judgment unit judges that discontinuity exists therebetween. Accordingly, it is possible to surely detect that the received content contains a partial edited content.

Here, in an aspect recited in Claim 10, with respect to each of the received nonce values, when a difference between the received nonce value and a nonce value that has been immediately previously received is equal to or greater than a second threshold, the judgment unit judges that discontinuity exist therebetween, when the difference is equal to or less than a first threshold, the judgment unit judges that continuity exists therebetween, and the second threshold is greater than the first threshold.

According to this aspect, when the difference between the received nonce value and the immediately previously received nonce value is equal to or greater than the second threshold, the judgment unit judges that discontinuity exists therebetween. Accordingly, it is possible to surely detect that the received content contains a partial edited content.

Here, in an aspect recited in Claim 11, when the judgment unit judges that the discontinuity exists, the writing unit further writes into the recording medium, as a point of the switch between the partial original content and the partial edited content, a position in the received content where the one piece of transfer data generated immediately after the switch is located.

1. Embodiment 1

The following describes a content transmission/reception system 80 as an embodiment of the present invention.

1.1 Structure of Content Transmission/Reception System 80

The content transmission/reception system 80 includes, as shown in FIG. 1, a content transmission device 60 and a content reception device 70. The content transmission device 60 edits an original content, which has been moved from the content reception device 70, and moves the edited content back to the content reception device 70. The content reception device 70 receives the edited content moved back from the content transmission device 60.

The content transmission device 60 includes a storage unit 61, a division unit 62, an encryption unit 63, and a transmission unit 64. The storage unit 61 stores therein an edited content, which is composed of a partial original content that is a part of an original content and a partial edited content that is a part obtained by editing a part of the original content. The division unit 62 divides each of the partial original content and the partial edited content to generate a plurality of pieces of transfer data. The encryption unit 63 generates a nonce value with respect to each of the pieces of transfer data, generates a key based on the generated nonce value, and encrypts the piece of transfer data with use of the generated key, thereby to generate a plurality of pieces of encrypted transfer data. The transmission unit 64 transmits the pieces of encrypted transfer data together with the respective nonce values in order of generation of the pieces of encrypted transfer data.

With respect to one piece of transfer data generated immediately after a switch between the partial original content and the partial edited content, the encryption unit 63 generates the nonce value such that the generated nonce value and a nonce value that has been immediately previously generated are discontinuous. On the other hand, with respect to each of the pieces of transfer data divided from the partial original content and the partial edited content excepting the one piece of transfer data generated immediately after the switch, the encryption unit 63 generates the nonce value such that the generated nonce value and a nonce value that has been immediately previously generated are continuous.

The content reception device 70 includes a reception unit 71, a decryption unit 72, a writing unit 73, and a judgment unit 74. The reception unit 71 sequentially receives, as a content, the pieces of encrypted transfer data together with the respective nonce values. The decryption unit 72 generates a key based on each of the received nonce values, and decrypts a corresponding one of the received pieces of encrypted transfer data with use of the generated key, thereby to obtain a plurality of pieces of transfer data. The writing unit 73 sequentially writes, as the content, the obtained pieces of transfer data into a recording medium. The judgment unit 74 judges, with respect to each of the nonce values received together with the respective pieces of encrypted transfer data, whether continuity or discontinuity exists between the received nonce value and a nonce value that has been immediately previously received.

When the judgment unit 74 judges that discontinuity exists therebetween, the writing unit 73 writes, into the recording medium, information indicating that the received content contains a partial edited content.

This structure exhibits an excellent effect that simply by making a comparison between each of the received nonce values and a nonce value that has been immediately previously received, it is possible to judge that the received content contains a partial edited content, thereby to easily judge that the received content differs from an original content.

1.2 Operations of Content Transmission/Reception System 80

The following describes operations of the content transmission/reception system 80.

(1) Operations of Content Transmission Device 60

Figure 19:
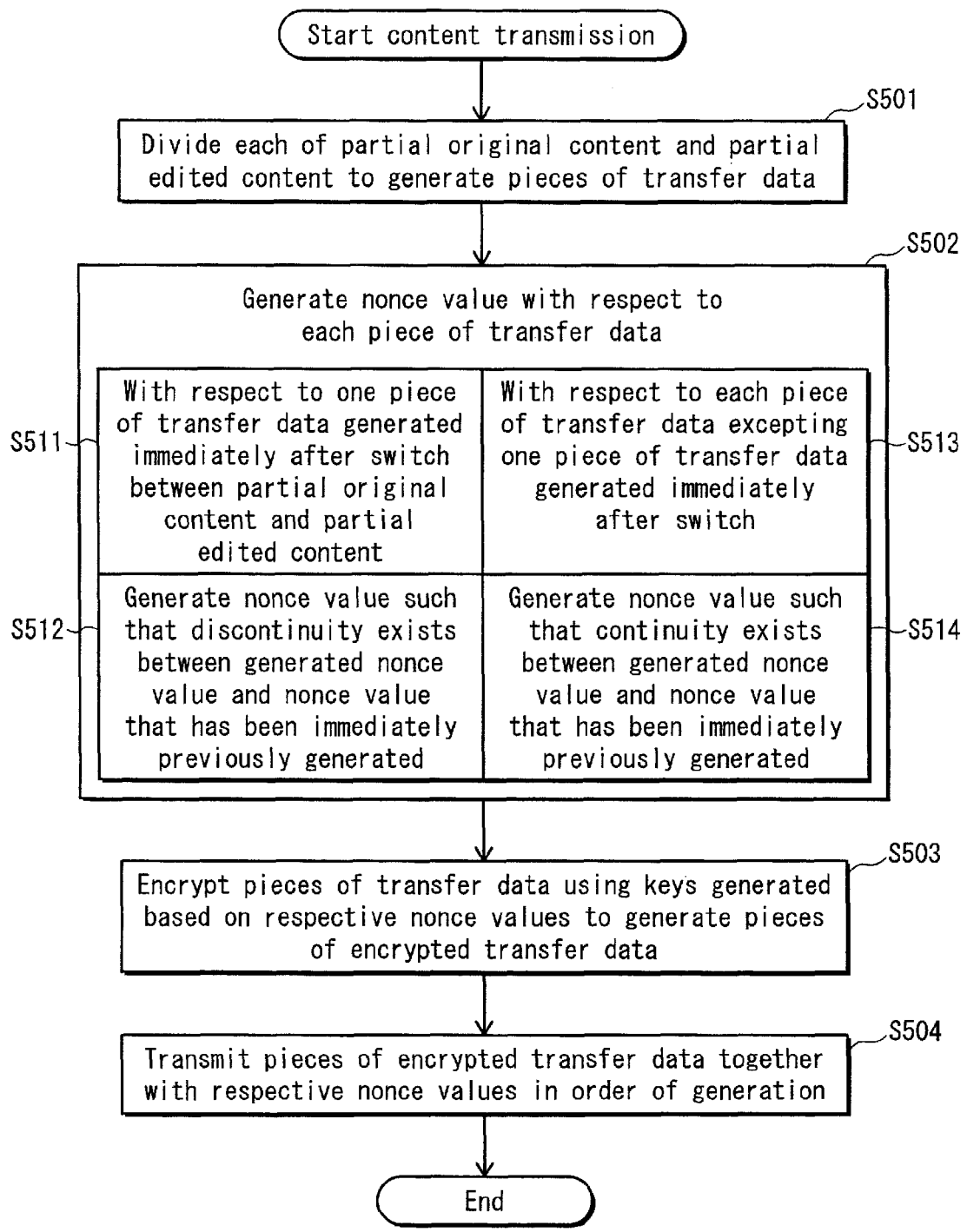
FIG. 19 shows a flowchart of operations of a content transmission device 60.

Here, operations of the content transmission device 60 are described, with reference to a flowchart shown in FIG. 19.

The division unit 62 divides each of a partial original content and a partial edited content to generate a plurality of pieces of transfer data (Step S501).

The encryption unit 63 generates a nonce value with respect to each of the pieces of transfer data (Step S502).

In this case, with respect to one piece of transfer data generated immediately after a switch between the partial original content and the partial edited content (Step S511), the encryption unit 63 generates the nonce value such that discontinuity exists between the generated nonce value and a nonce value that has been immediately previously generated (Step S512). On the other hand, with respect to each of the pieces of transfer data divided from the partial original content and the partial edited content excepting the one piece of transfer data generated immediately after the switch (Step S513), the encryption unit 63 generates the nonce value such that continuity exists between the generated nonce value and a nonce value that has been immediately previously generated (Step S514).

The encryption unit 63 encrypts the pieces of transfer data with use of keys generated based on the respective generated nonce values, thereby to obtain a plurality of pieces of encrypted transfer data (Step S503).

The transmission unit 64 transmits the pieces of encrypted transfer data together with the respective nonce values in order of generation of the pieces of encrypted transfer data (Step S504).

(2) Operations of Content Reception Device 70

Figure 20:
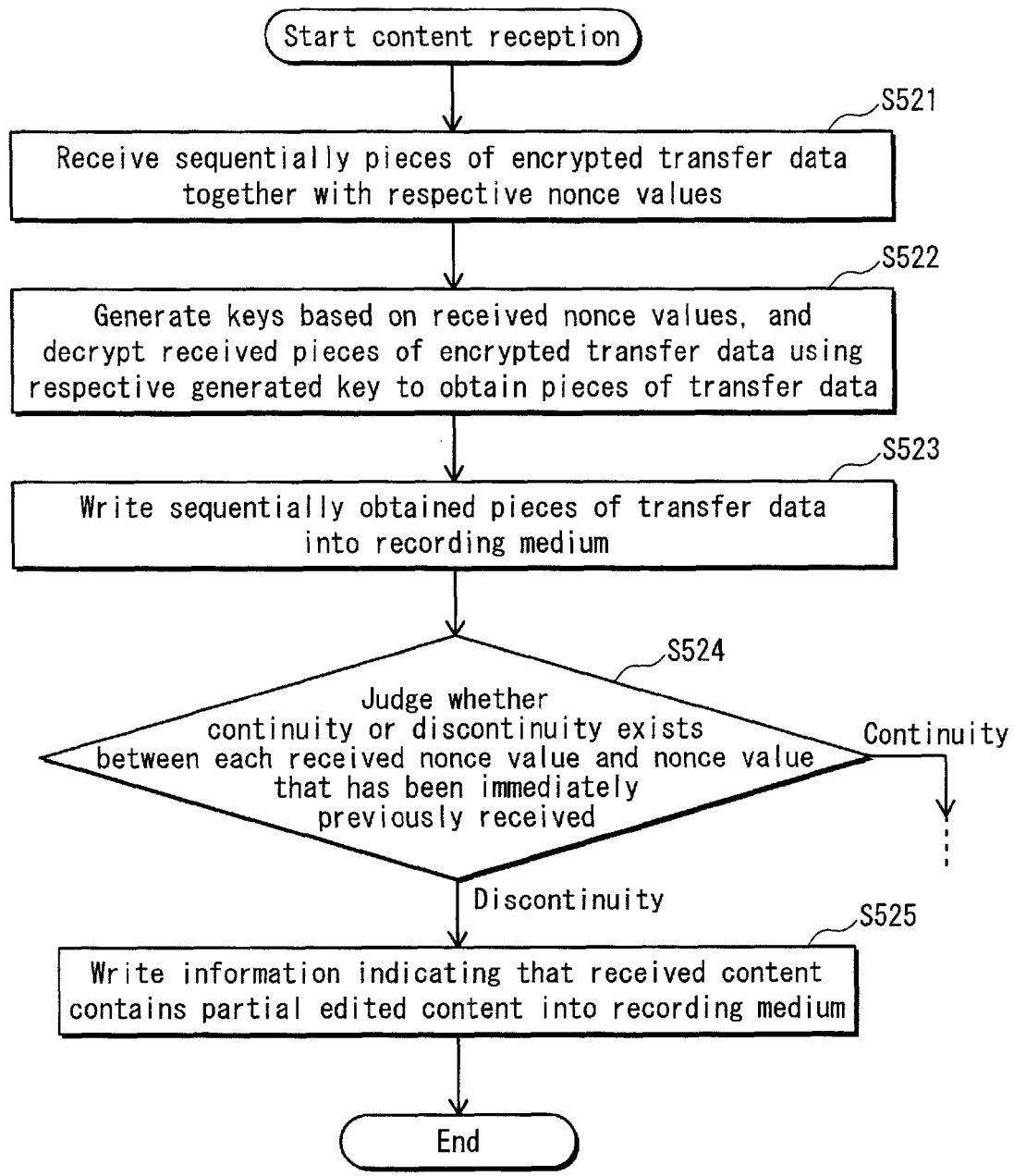
FIG. 20 shows a flowchart of operations of a content reception device 70.

Here, operations of the content reception device 70 are described, with reference to a flowchart shown in FIG. 20.

The reception unit 71 sequentially receives, as a content, the pieces of encrypted transfer data together with the respective nonce values (Step S521).

The decryption unit 72 generates a key based on each of the received nonce values, and decrypts a corresponding one of the received pieces of encrypted transfer data with use of the generated key, thereby to obtain a plurality of pieces of transfer data (Step S522).

The writing unit 73 sequentially writes, as the content, the obtained pieces of transfer data into the recording medium (Step S523).

With respect to each of the nonce values received together with the respective pieces of encrypted transfer data, the judgment unit 74 judges whether continuity or discontinuity exists between the nonce value and a nonce value that has been immediately previously received (Step S524).

When the judgment unit 74 judges that discontinuity exists therebetween (Step S524: YES), the writing unit 73 writes, into the recording medium, information indicating that the received content contains a partial edited content (Step S525).

2. Embodiment 2

The following describes a content transmission/reception system 50 as another embodiment of the present invention.

2.1 Content Transmission/Reception System 50

Figure 2:
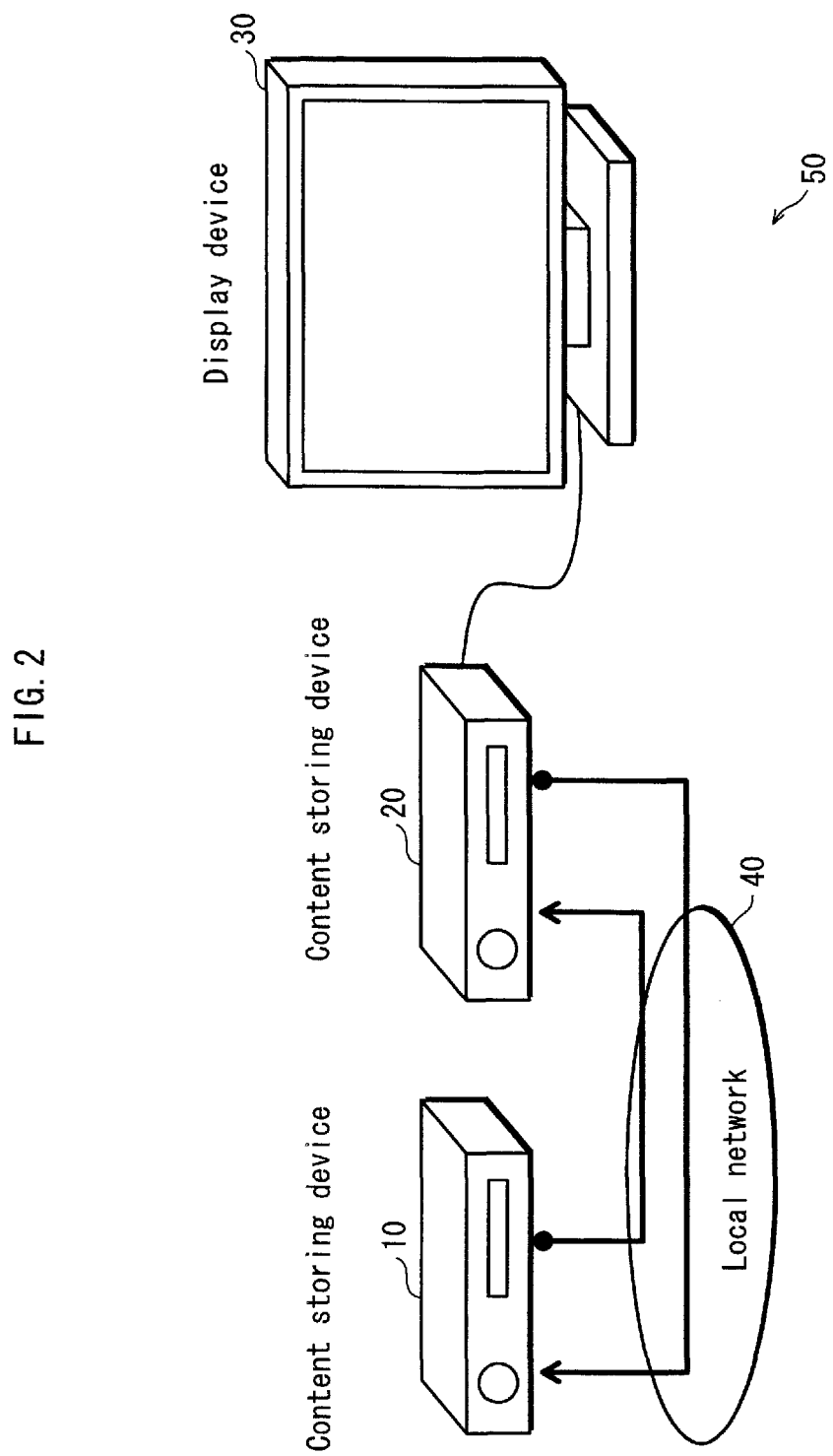
FIG. 2 shows the structure of a content transmission/reception system 50 as an embodiment 2 of the present invention.

The content transmission/reception system 50 includes, as shown in FIG. 2, a content storing device 10 and a content storing device 20. The content storing devices 10 and 20 are connected to each other via a local network 40 using a wired LAN complying with IEEE802.3 or the like, and perform transmission and reception of digital data therebetween via TCP/IP. Also, the content storing device 20 is connected to a display device 30 via an HDMI (High-Definition Multimedia Interface) cable or the like that allows transmission of uncompressed video and audio. For convenience of description, the content storing devices 10 and 20 have the same structure here.

In response to a user operation, the content storing device 10 receives an original content broadcast via a terrestrial wave, BS, CS, or the like, and records the received original content into a built-in hard disk. Also, in response to a user operation, the content storing device 10 moves the original content recorded in the hard disk to the content storing device 20 via the local network 40.

The content storing device 20 receives the original content from the content storing device 10, and records the received original content into a built-in hard disk. Also, in response to a user operation, the content storing device 20 performs playback and edition of the original content. Furthermore, in response to a user operation, the content storing device 20 moves the original content or an edited content obtained by editing the original content back to the content storing device 10.

Note that each of the contents is composed of one or more partial contents. Each of the partial contents constitutes single unified video audio stream data.

The content storing device 10 is specifically a digital broadcast reception device, a PC, an HDD recorder, or the like. Also, the content storing device 20 is specifically an HDD recorder, a PC, a mobile device such as a mobile phone, or the like. Note that, in the above description, the content storing devices 10 and 20 have the same structure. Alternatively, the content storing devices 10 and 20 may not have completely the same structure.

2.2 Content Storing Devices 10 and 20

Figure 3:
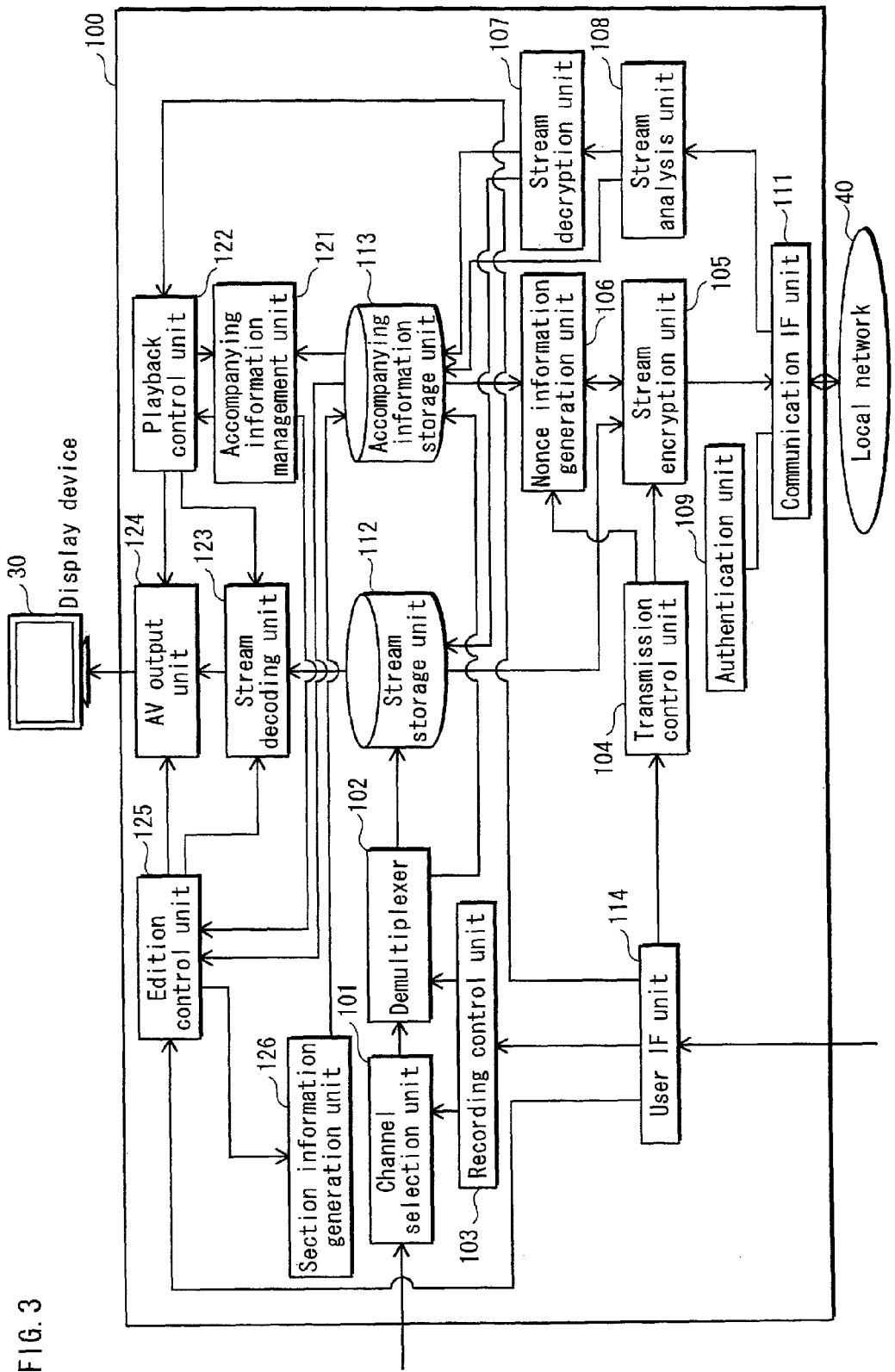
FIG. 3 is a block diagram showing the structure of a content storing device 100.

The content storing devices 10 and 20 have the same structure, and each of which is described as a content storing device 100 with reference to FIG. 3.

The content storing device 100 includes, as shown in FIG. 3, a channel selection unit 101, a demultiplexer 102, a recording control unit 103, a transmission control unit 104, a stream encryption unit 105, a Nonce information generation unit 106, a stream decryption unit 107, a stream analysis unit 108, an authentication unit 109, a communication IF unit 111, a stream storage unit 112, an accompanying information storage unit 113, a user IF unit 114, an accompanying information management unit 121, a playback control unit 122, a stream decoding unit 123, an AV output unit 124, an edition control unit 125, and a section information generation unit 126.

Each of the structural elements of the content storing device 100 includes a memory such as a ROM and a RAM and a CPU. All or part of the structural elements is realized by the CPU operating in accordance with control programs stored in the memory.

The following structural elements of the content storing device 100 may be composed of a single integrated circuit: the channel selection unit 101, the demultiplexer 102, the recording control unit 103, the transmission control unit 104, the stream encryption unit 105, the Nonce information generation unit 106, the stream decryption unit 107, the stream analysis unit 108, the authentication unit 109, the communication IF unit 111, the user IF unit 114, the accompanying information management unit 121, the playback control unit 122, the stream decoding unit 123, the AV output unit 124, the edition control unit 125, and the section information generation unit 126.

(1) Stream Storage Unit 112 and Accompanying Information Storage Unit 113

The stream storage unit 112 is composed of a storage medium such as a hard disk, and has an area for storing video audio stream data of a digital broadcast program (i.e., content). The digital broadcast program, which has been broadcast via the terrestrial wave, BS, CS, or the like, is received via a TV antenna. Alternatively, the stream storage unit 112 may store therein stream data of a content received via the local network 40, and further alternatively may store therein video audio stream data of a content created by the user with use of a movie camera or the like. The stream data such as described above is stream data in MPEG2-TS format, which is compliant with the ARIB (Association of Radio Industries and Broadcast) standards.

The accompanying information storage unit 113 is composed of a storage medium such as a hard disk, and has an area for storing accompanying information 601. The accompanying information 601 accompanies the stream data of the content stored in the stream storage unit 112. The accompanying information 601 accompanies, for example, stream data of a content received via the local network 40 and stored in the stream storage unit 112, or accompanies stream data of a broadcast content that has been received. Alternatively, the accompanying information 601 may accompany video audio stream data of a content created by the user with use of a movie camera or the like.

Furthermore, the accompanying information storage unit 113 stores therein accompanying information newly generated by the stream analysis unit 108.

Figure 4:
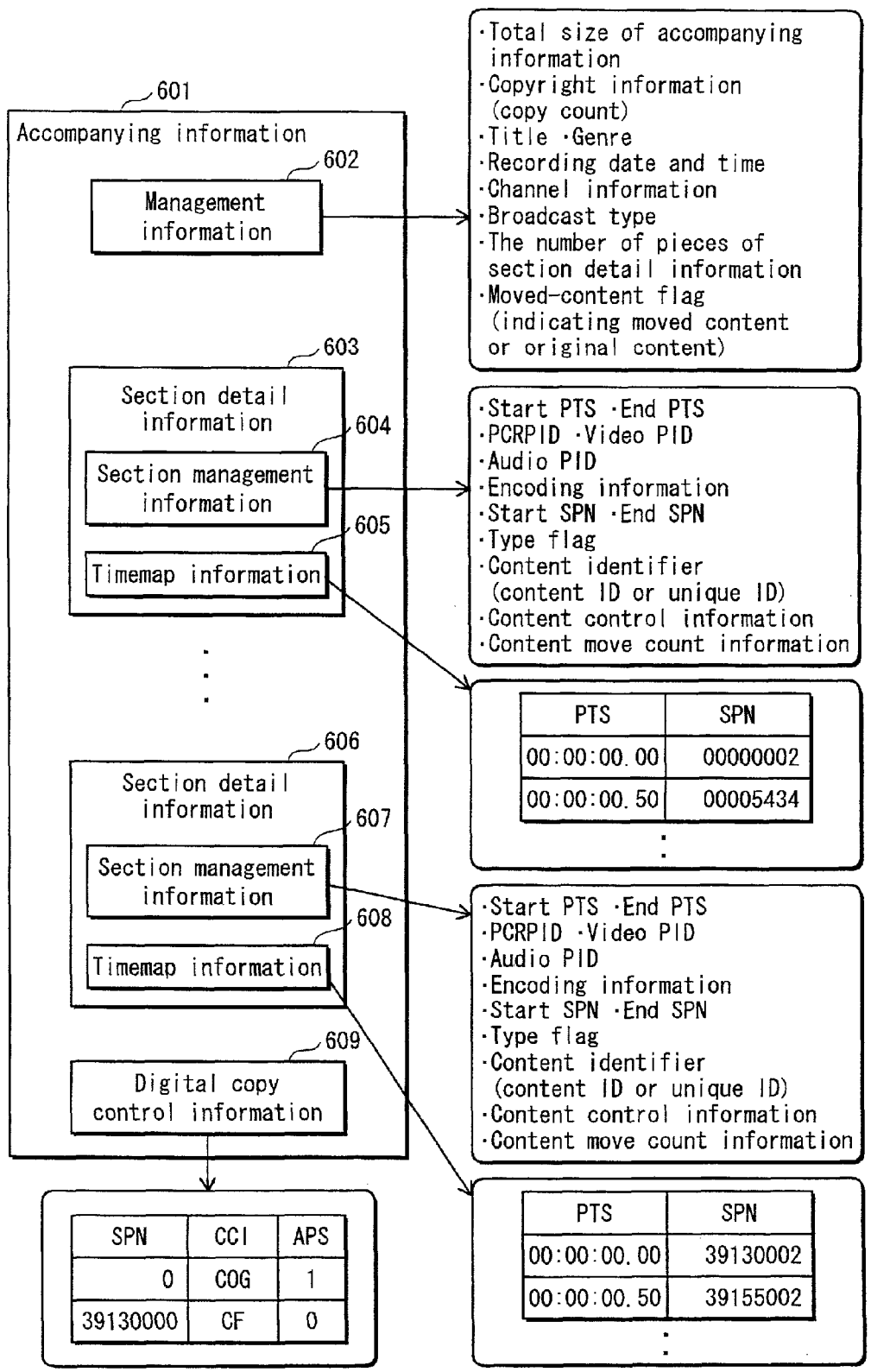
FIG. 4 shows an example of the data structure of accompanying information 601.

The accompanying information 601 is, for example as shown in FIG. 4, composed of management information 602 for managing the entire content and pieces of section detail information 603, . . . , 606 with respect to respective stream sections. Furthermore, the accompanying information 601 may contain digital copy control information 609 as an optional extra. In the case where the content is composed of a plurality of partial contents, the pieces of section detail information 603, . . . , 606 are in one-to-one correspondence with the partial contents. Here, each of the stream sections indicates a range where a corresponding one of the partial contents constituting the content is located. Each of the partial contents is a single unified part as described above, and corresponds to the same piece of copyright information or the like. Specifically, a right of one of the partial contents is held by a right owner A, and a right of another one of the partial contents is held by a right owner B. Note that, instead of copyright information, the partial contents may be sectionized by other factor.

The management information 602 contains: the entire size of the accompanying information; copyright information such as a copy count; a title of the content (program); a genre of the content; a recording day and time of the content; the entire recording time of the content; Ch (Channel) information indicating a channel via which the content has been broadcasted; a broadcast type of the content indicating terrestrial wave digital broadcast, BS broadcast, CS broadcast or the like; the number of section detail information indicating the number of pieces of section detail information contained in the accompanying information; a resume position indicating a position where the last playback has stopped; a moved-content flag indicating whether the content is a moved content or an original content; reference information for referring to pieces of section detail information corresponding to the respective stream sections constituting the content; and so on. Also, the management information 602 may contain an identifier identifying the content.

In the case where the content is an original content, the management information 602 may not need to contain the moved-content flag.

The section detail information 603 contains section management information 604 and timemap information 605. The section management information 604 contains a stream structure, an encoding method, and so on that are necessary for decoding video and audio. Also, the section management information 604 may contain a type flag as an optional extra. Furthermore, the section management information 604 may contain a content identifier identifying the content as an optional extra. Here, the type flag indicates whether a partial content corresponding to the section detail information 603 is a partial original content or a partial edited content. Furthermore, the section management information 604 may contain content control information and content move count information as an optional extra. Note that the content control information and the content move count information are described later.

The timemap information 605 is an index table for performing random access to the stream data.

The digital copy control information 609 is information for controlling move of the content and a copy count of the content.

(2) Recording Control Unit 103, Channel Selection Unit 101, and Demultiplexer 102

The recording control unit 103 receives a recording instruction from the user via the user IF unit 114, and instructs the channel selection unit 101 to select a channel of a recording target content. Then, the recording control unit 103 instructs the demultiplexer 102 to start and end of recording the recording target content into the accompanying information storage unit 113 and the stream storage unit 112.

The channel selection unit 101 includes a digital broadcast tuner, and controls the digital broadcast tuner. The channel selection unit 101 demodulates a broadcast wave having a frequency designated by the channel selected by the recording control unit 103 among radiowaves received via the TV antenna, descrambles the demodulated broadcast wave, and outputs the descrambled broadcast wave as an MPEG2-TS to the demultiplexer 102.

The demultiplexer 102 performs video analysis, audio analysis, and section analysis on the received MPEG2-TS under the control by the recording control unit 103, thereby to separate MPEG2-TS into video audio stream data and accompanying information, and then writes the video audio stream data into the stream storage unit 112, and writes the accompanying information into the accompanying information storage unit 113.

(3) Communication IF Unit 111 and Authentication Unit 109

The communication IF unit 111 includes a network communication unit, and is connected to the local network 40. The communication IF unit 111 performs interactive communication with a plurality of other devices via the local network 40. The communication IF unit 111 executes a series of communication protocols relating to detection of a device to which a content can be moved and transmission of the content. In the present embodiment, UPnP is used for detection of such a destination device, and HTTP (Hyper Text Transfer Protocol) is used for transmission of the content.

The communication IF unit 111 receives packets (PCPs: Protected Content Packets) from another devices, as the minimum unit for communication.

Here, an example of the data structure of a packet is described with reference to FIG. 5 and FIG. 6.

Figure 5:
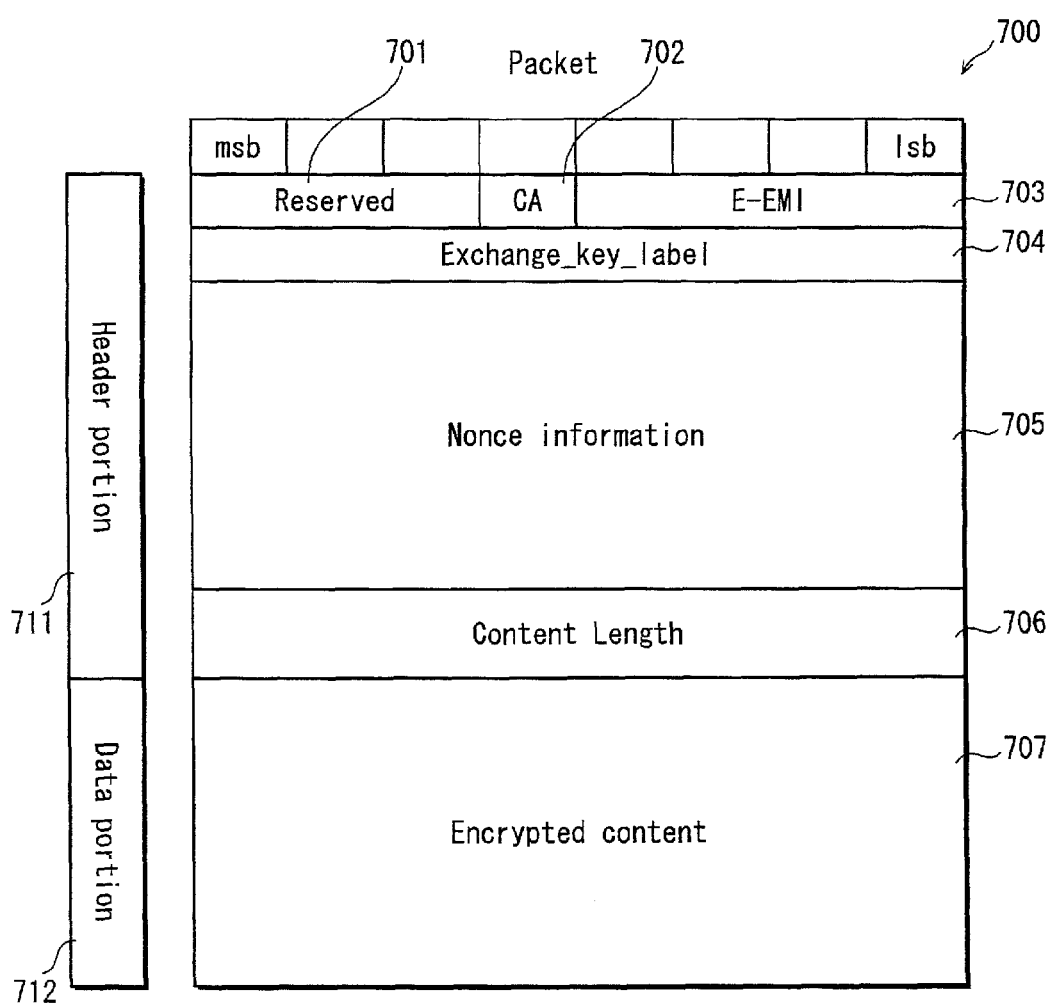
FIG. 5 shows an example of the data structure of a packet 700.

A packet 700 of a content shown in FIG. 5 as an example is composed of a header portion 711 and a data portion 712. The header portion 711 contains a reserved area (Reserved) 701, CA (Cipher Algorithm) 702, E-EMI (Extended Encryption Mode Indicator) 703, Exchange_key_label 704, Nonce information 705, and Content Length 706. The data portion 712 contains encrypted unit data 707. Note that description of unit data is provided later.

The E-EMI 703 is information for use in copy control set with respect to the content. The details are described in the Non-Patent Literature 1. The Content Length 706 indicates a length of data contained in the data portion 712 of the packet 700.

Figure 6:
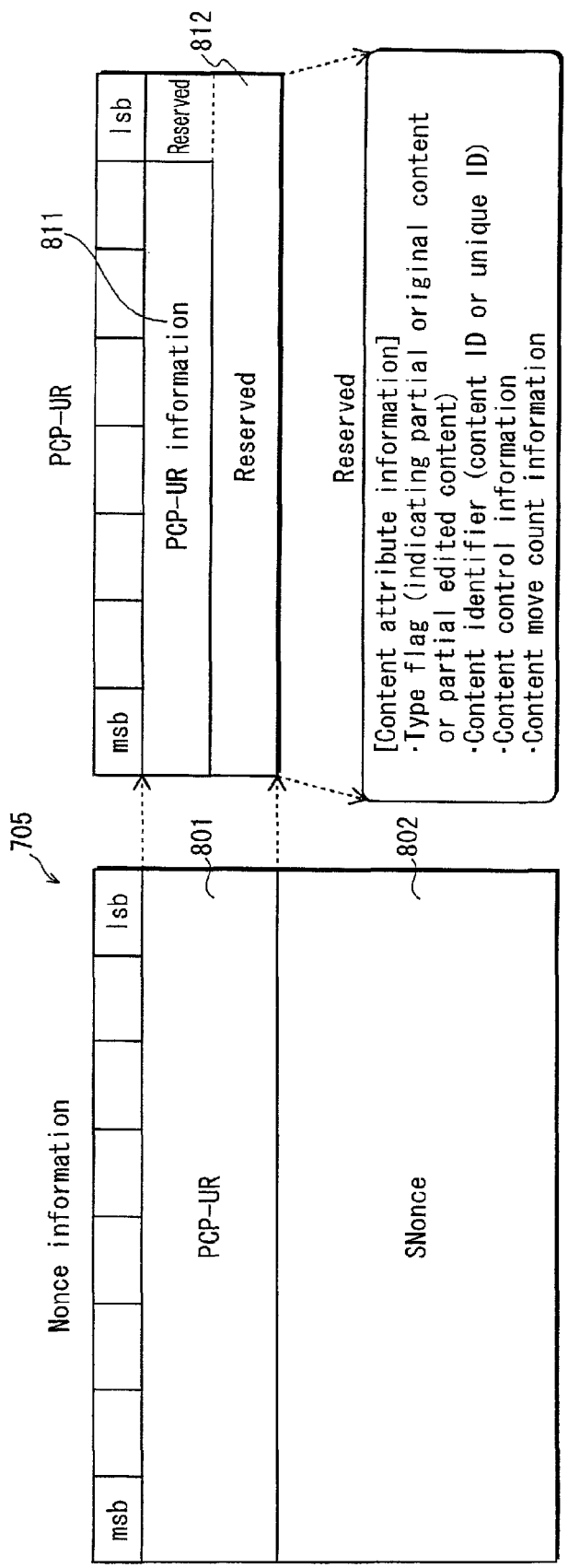
FIG. 6 shows an example of the data structure of Nonce information 705.

The Nonce information 705 is composed of, as shown in FIG. 6, PCP-UR (Protected Content Packet-Usage Rule) 801 and an SNonce 802. The PCP-UR 801 contains PCP-UR information 811 and a reserved area (Reserved) 812. The PCP-UR information 811 contains information indicating how the PCP-UR 801 is interpreted, a type of the content, and so on. The reserved area 812 may contain content attribute information as an optional extra. In the case where the reserved area 812 does not contain such content attribute information, the reserved area 812 is zero-padded.

Also, the content attribute information contains a type flag indicating whether each partial content contained in the content is a partial original content or a partial edited content, a content identifier (referred to also as "content ID" or "unique ID") identifying the content, content control information, and content move count information.

Figure 7:
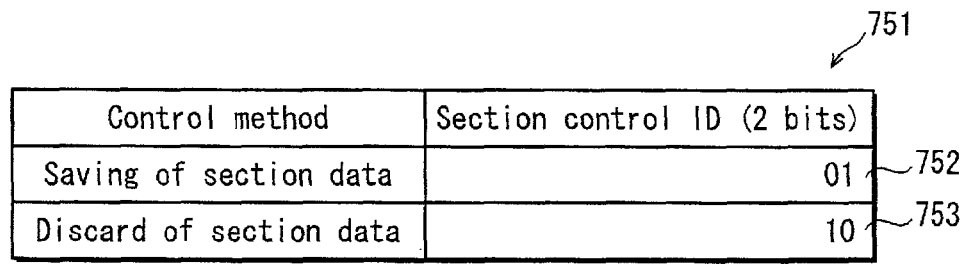
FIG. 7 shows a section control ID as an example of content control information and respective controls corresponding to values of the section control ID.

The content control information contains a section control ID, for example. The section control ID is represented in 2 bits, and has a value of "01" or "10", as shown in FIG. 7 for example. Also, FIG. 7 shows respective controls corresponding to the values of the section control ID. The section control ID having a value of "01" indicates saving of section data, and the section control ID having a value of "10" indicates discard of section data. In other words, the section control ID having a value of "01" indicates control of storing unit data obtained by decrypting encrypted unit data contained in the packet 700 into the stream storage unit 112. Also, the section control ID having a value of "10" indicates control of skipping the packet 700 without decrypting encrypted unit data contained in the packet 700 or storing unit data obtained by decrypting the encrypted unit data contained in the packet 700 into the stream storage unit 112.

The content move count information indicates the maximum permissible number of times of moving the content. Note that the content control information and the content move count information may be set arbitrarily.

The content storing device 10 notifies the content storing device 20 of a unique ID of an original content, by containing the unique ID in content attribute information of the content, for example.

The authentication unit 109 performs AKE (Authentication and Key Exchange) with a communication party device.

Also, the authentication unit 109 performs processing relating to a copyright of a content. Specifically, when transmission of all the pieces of stream data of the content completes, and when reception of all the pieces of stream data of the content completes, the authentication unit 109 updates digital copy control information of accompanying information stored in the accompanying information storage unit 113. For example, in the case where digital copy control information contains content copy count information indicating the number of times the content has been copied, when one-time copy completes, the authentication unit 109 increments the content copy count information by a value of "1", thereby to update the accompanying information stored in the accompanying information storage unit 113.

(4) Transmission Control Unit 104

The transmission control unit 104 controls move of a content selected by the user to another device. The transmission control unit 104 instructs the communication IF unit 111 to detect a destination device and prepare transmission of the selected content. Also, the transmission control unit 104 instructs the stream encryption unit 105 and the Nonce information generation unit 106 to generate stream data to be transmitted.

(5) Nonce Information Generation Unit 106

In accordance with the instruction by the transmission control unit 104, the Nonce information generation unit 106 reads accompanying information corresponding to a content selected by the user from the accompanying information storage unit 113. Then, the Nonce information generation unit 106 judges whether the content selected by the user is an original content or a moved content, with use of a moved-content flag contained in management information of the read accompanying information. When the management information does not contain the moved-content flag, the Nonce information generation unit 106 judges that the selected content is an original content. Next, the Nonce information generation unit 106 generates information to be contained in a header portion of each packet with use of the read accompanying information, and outputs the header portion containing the generated information to the stream encryption unit 105.

Also, the Nonce information generation unit 106 generates E-EMI with use of content control information and so on contained in section management information of the accompanying information. Also, the Nonce information generation unit 106 generates PCP-UR information based on the content control information and so on contained in the section management information of the accompanying information. Furthermore, the Nonce information generation unit 106 stores, into a reserved area of PCP-UR, a type flag, a content identifier, the content control information, and content move count information contained in the section management information, as content attribute information.

Moreover, the Nonce information generation unit 106 generates or updates an SNonce in the following manner.

(SNonce Generation)

For example, when a TCP connection is established with a communication party device, and when video audio stream data starts being read from the stream storage unit 112 (i.e., when a piece of unit data at the top of the video audio stream data starts being read), the Nonce information generation unit 106 performs SNonce generation by generating a random value and storing the generated random value into SNonce. Here, the random value has 47 bit length, for example.

Also, when transmission of all the packets of a partial original content completes and then the top packet of a partial edited content is generated, the Nonce information generation unit 106 generates a random value as an SNonce of the partial edited content such that discontinuity exists between the generated random value and an SNonce that has been immediately previously generated.

Note that when transmission of all the packets of the partial original content completes and then the top packet of the partial edited content is generated, the Nonce information generation unit 106 may perform following such that discontinuity exists between the SNonce of the partial edited content and the SNonce that has been immediately previously generated.

That is, the Nonce information generation unit 106 generates a random value as an SNonce, and judges whether or not a difference between the currently generated random value and an SNonce that has been previously immediately generated is equal to or greater than a predetermined second threshold such as a value of "1000". When judging that the difference is equal to or greater than the second threshold, the Nonce information generation unit 106 adopts the currently generated random value. When judging that the difference is less than the second threshold, the Nonce information generation unit 106 discards the currently generated random value, and again generates a new random value and makes the similar judgment. The Nonce information generation unit 106 repeats such random value generation and judgment until a generated random value satisfies the condition that the difference between the generated random value and an SNonce that has been previously immediately generated is equal to or greater than the second threshold. When the generated random value satisfies the condition that the difference is equal to or greater than the second threshold, the Nonce information generation unit 106 adopts the generated random value, and stores the adopted random value into the SNonce. The Nonce information generation unit 106 may perform SNonce generation in this way.

Here, the second threshold is greater than a first threshold. The first threshold is a threshold for judging that continuity exists between SNonces. When the difference is equal to or less than the first threshold, it is judged that continuity exists between the SNonces. The first threshold is for example "1". The second threshold is a threshold for judging that discontinuity exists between SNonces. When the difference is equal to or greater than the second threshold, it is judged that discontinuity exists between the SNonces.

The difference cannot fall within a range of values greater than the first threshold and less than the second threshold. By setting this range of values, it is possible to make the judgments as to that continuity exists and that discontinuity exists. For such a reason, the different thresholds are used for respective judgments as to that continuity exists and that discontinuity exists.

As described above, when transmission of all the packets of a partial original content completes and then the top packet of a partial edited content is generated, the Nonce information generation unit 106 temporarily stores therein an SNonce that has been immediately previously generated. When transmission of all the packets of the partial edited content completes and then the top packet of another partial original content contained in the same content is generated, the Nonce information generation unit 106 reads the temporarily stored SNonce, and updates the read SNonce for use as an SNonce of the other partial original content.

(SNonce Update)

Also, the Nonce information generation unit 106 performs SNonce update, for example, by incrementing an SNonce that has been immediately previously generated by a value of "1" in accordance with the read size of the stream data or the change of indication by the copy control information. For example, each time data of 128 MB (this unit data is referred to as "transfer data") is read, the Nonce information generation unit 106 may increment an SNonce, which has been immediately previously generated, by a value of "1". Alternatively, when indication by the copy control information changes from NMC (No More Copies) to COG (Copy One Generation), the Nonce information generation unit 106 may increment an SNonce, which has been immediately previously generated, by a value of "1", for example.

Next, the Nonce information generation unit 106 stores the generated or updated SNonce into Nonce information of a packet.

As described above, the Nonce information generation unit 106 sets the SNonces contained in a plurality of packets with respect to each of all the pieces of unit data contained in the same partial content, such that continuity exists between the SNonces. Also, the Nonce information generation unit 106 sets the SNonces, such that discontinuity exists between SNonces at a switch from a partial original content to a partial edited content or at a switch from a partial edited content to a partial original content.

(Example of SNonce)

Figure 8:
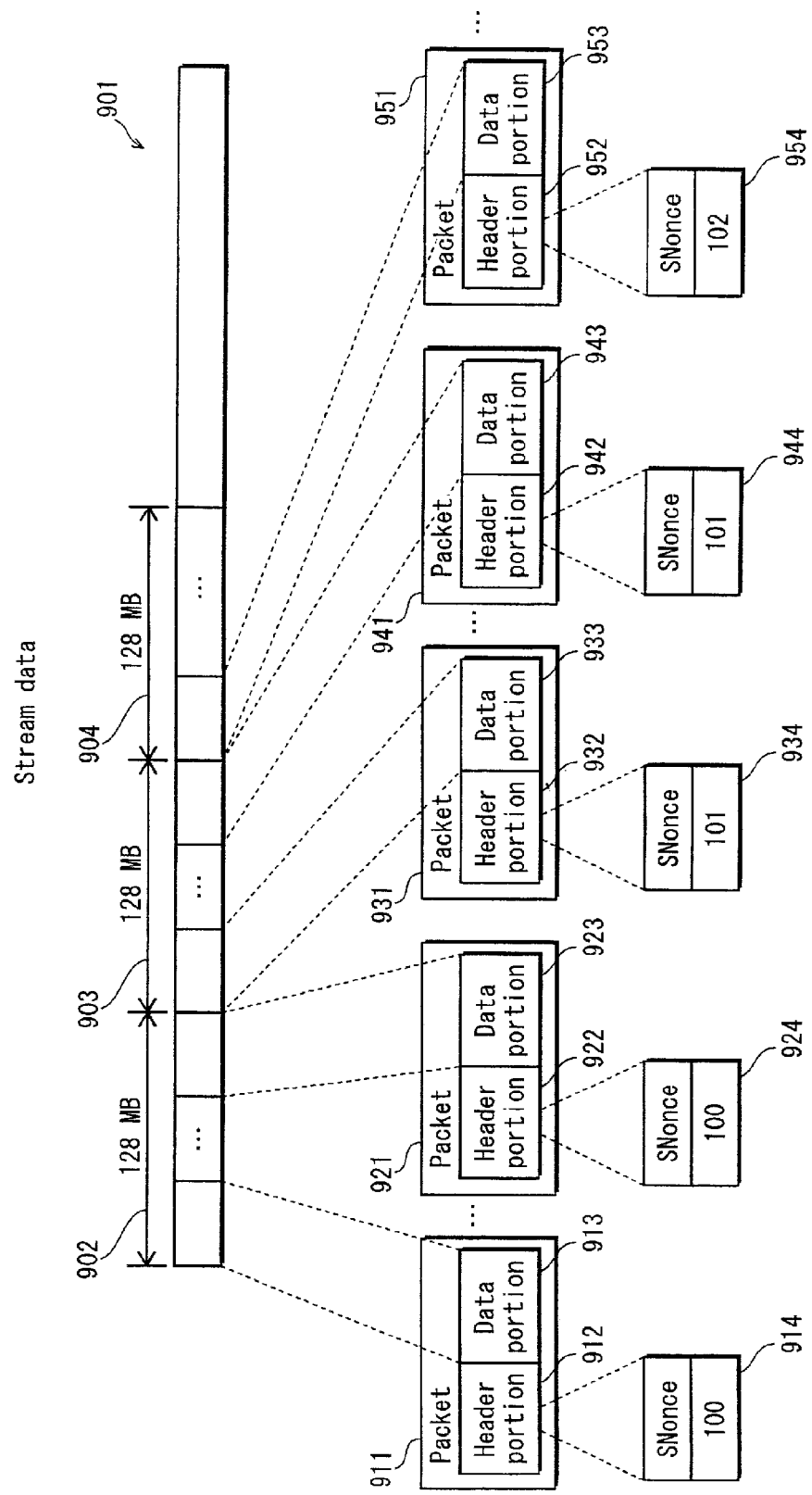
FIG. 8 shows an example of an SNonce stored in a header portion of each of packets 911, . . . , 921, 931, . . . , 941, and 951, . . . generated from stream data 901.

FIG. 8 shows an example of an SNonce stored in a header portion of each of packets 911, . . . , 921, 931, . . . , 941, and 951, . . . generated from stream data 901.

The stream data 901 is composed of pieces of transfer data 902, 903, 904, . . . . Each of the pieces of transfer data has a length of 128 MB. Each of the pieces of transfer data is composed of a plurality of pieces of unit data. Each of the pieces of unit data has a predetermined unit length.

A plurality of pieces of encrypted unit data contained in a data portion of each of the packets 911, . . . , 921 are generated by encrypting the pieces of unit data of the transfer data 902. The packets 911, . . . , 921 each have an SNonce of the same value of "100" stored in respective header portions. A plurality of pieces of encrypted unit data contained in a data portion of each of the packets 931, . . . , 941 are generated by encrypting the pieces of unit data of the transfer data 903. The packets 931, . . . , 941 each have an SNonce of the same value of "101" stored in respective header portions. A plurality of pieces of encrypted unit data contained in a data portion of each of the packets 951, . . . are generated by encrypting the pieces of unit data of the transfer data 904. The packets 951, . . . each have an SNonce of the same value of "102" stored in respective header portions.

In this way, a plurality of packets generated with respect to the same piece of transfer data have the same SNonce. Also, in the case where stream data of the same partial content contains first transfer data and second transfer data that is immediately subsequent to the first transfer data, each of packets generated with respect to the second transfer data has an SNonce resulted from incrementing an SNonce of packets generated with respect to the first transfer data by a value of "1".

In this way, an SNonce of a certain packet and an SNonce of a packet immediately previous to the certain packet are continuous. Here, continuity of SNonces between the certain packet and the packet immediately previous to the certain packet means that a difference of SNonces between the certain packet and the immediately previous packet is "0" or "1", as described above. In other words, continuity means that the difference is equal to or less than the first threshold that is "1".

(Another Example of SNonce)

Figure 9:
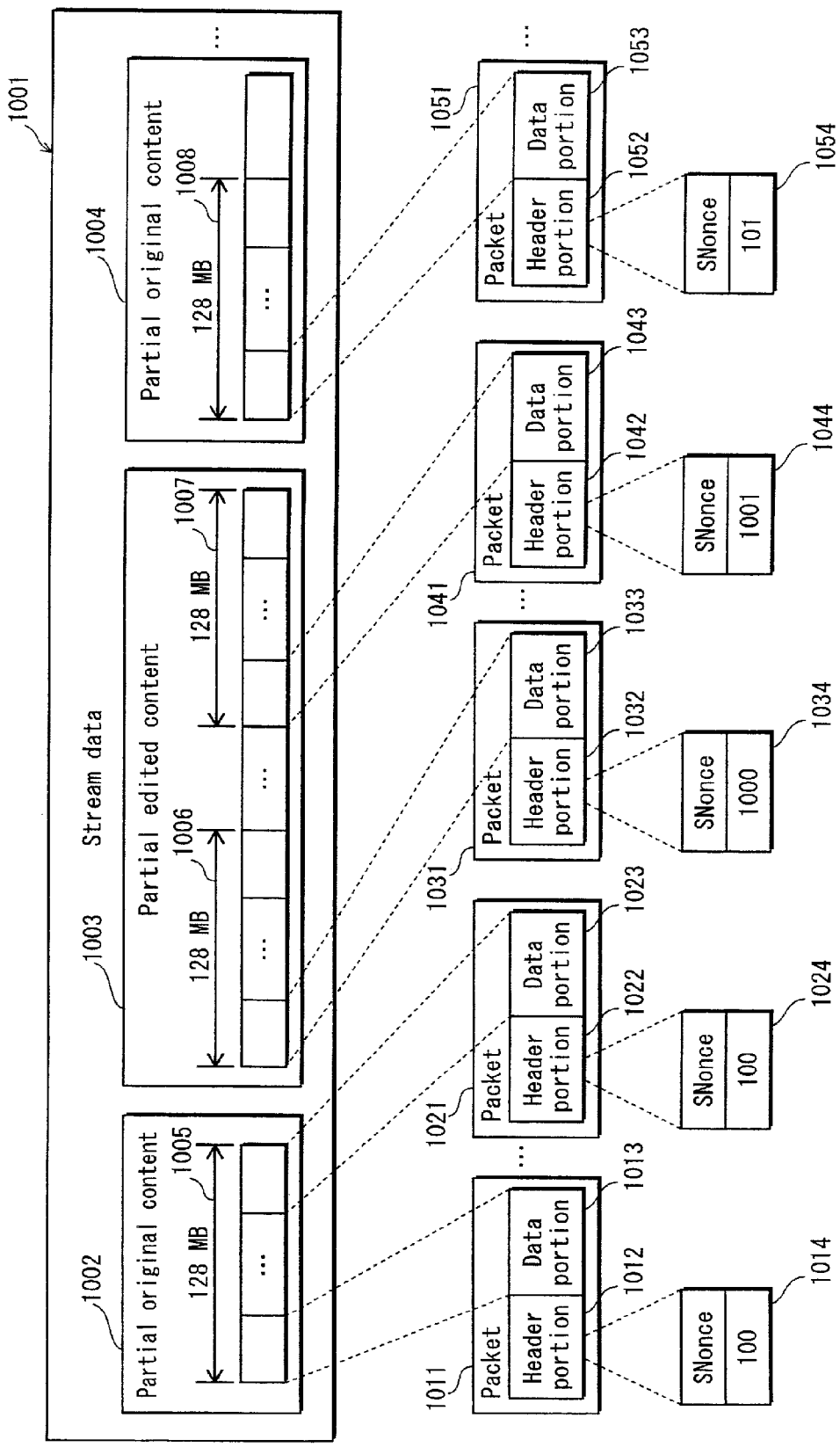
FIG. 9 shows an example of an SNonce stored in a header portion of each of packets 1011, . . . , 1021, 1031, . . . , 1041, and 1051, . . . generated from stream data 1001.

FIG. 9 shows an example of an SNonce stored in a header portion of each of packets 1011, . . . , 1021, 1031, . . . , 1041, and 1051, . . . generated from stream data 1001.

The stream data 1001 is composed of a partial original content 1002, a partial edited content 1003, and a partial original content 1004, . . . . Also, the partial original content 1002 is composed of a piece of transfer data 1005, . . . , the partial edited content 1003 is composed of pieces of transfer data 1006, . . . , 1007, and the partial original content 1004 is composed of a piece of transfer data 1008, . . . . Each of the pieces of transfer data has a length of 128 MB. Each of the pieces of transfer data is composed of a plurality of pieces of unit data. Each of the pieces of unit data has a predetermined unit length.

A plurality of pieces of encrypted unit data contained in a data portion of each of the packets 1011, . . . , 1021 are generated by encrypting the pieces of unit data of the transfer data 1005 of the partial original content 1002. The packets 1011, . . . , 1021 each have an SNonce of the same value of "100" stored in respective header portions.

A plurality of pieces of encrypted unit data contained in a data portion of each of the packets 1031, . . . are generated by encrypting the pieces of unit data of the transfer data 1006 of the partial edited content 1003. The packets 1031, . . . each have an SNonce of the same value of "1000" stored in respective header portions.

Also, a plurality of pieces of encrypted unit data contained in a data portion of each of the packets 1041, . . . are generated by encrypting the pieces of unit data of the transfer data 1007 of the partial edited content 1003. The packets 1041, . . . each have an SNonce of the same value of "1001" stored in respective header portions.

Also, a plurality of pieces of encrypted unit data contained in a data portion of each of the packets 1051, . . . are generated by encrypting the pieces of unit data of the transfer data 1008 of the partial original content 1004. The packets 1051, . . . each have an SNonce of the same value of "101" stored in respective header portions.

In this way, a plurality of packets generated with respect to the same piece of transfer data of the same partial content have the same SNonce. Also, in the case where stream data contains first transfer data and second transfer data that is immediately subsequent to the first transfer data, which have been divided from the same partial content, each of packets generated with respect to the second transfer data has an SNonce resulted from incrementing an SNonce of packets generated with respect to the first transfer data by a value of "1". In this way, an SNonce of a certain packet and an SNonce of a packet immediately previous to the certain packet are continuous.

On the other hand, at the switch from the partial original content 1002 to the partial edited content 1003, the top packet 1031 contained in the top piece of transfer data 1006 of the partial edited content 1003 has the SNonce 1034 of a value of "1000", and this value differs from an SNonce 1024 having a value of "100" of the packet 1021 that is immediately previous to the packet 1031. Accordingly, discontinuity exists therebetween. Also, at the switch from the partial edited content 1003 to the original partial content 1004, the top packet 1051 contained in the top piece of transfer data 1008 has the SNonce 1054 of a value of "101", and this value differs from an SNonce 1044 having a value of "1001" of the packet 1041 that is immediately previous to the packet 1051. Accordingly, discontinuity exists therebetween.

Also, the SNonce 1054 having a value of "101" results from incrementing the SNonce 1024 having a value of "100" of the packet 1021 by a value of "1".

Continuity and discontinuity are defined as follows. That is, discontinuity means that a difference of SNonces between a certain packet and a packet that is immediately previous to the certain packet is greater than the first threshold. On the other hand, continuity means that the difference of SNonces between the certain packet and the immediately previous packet is equal to or less than the first threshold.

Note that, although the first threshold is "1" as an example in the above description, the first threshold alternatively may be "5". Assume that in the case where a plurality of packets having continuous SNonces, which have been generated with respect to pieces of transfer data contained in the same partial original content, are transmitted, an error occurs such as a loss of some of the packets, which are to be sequentially transmitted on the network, for example. In such a case, a difference of SNonces between a certain one of the packets and one of the packets that is immediately previous to the certain packet might be greater than "1". Here, the first threshold set to not "1" but "5" is used for judging whether continuity exists between the certain packet and the immediately previous packet. This decreases a probability of erroneously judging that a switch has occurred to a partial edited content (or a partial original content). In other words, when the difference is equal to or greater than "2" and equal to or less than "5", some error or the like could have occurred. Also in this case, a piece of received transfer data may be considered to be contained in the same partial original content (or the same partial edited content).

Note that continuity and discontinuity may be defined as follows. That is, discontinuity may mean that a difference of SNonces between a certain packet and a packet that is immediately previous to the certain packet is equal to or greater than the second threshold. The second threshold here is for example "1000". On the other hand, continuity may mean that the difference of SNonces between the certain packet and the immediately previous packet is equal to or less than the first threshold. The second threshold here is greater than the first threshold.

(6) Stream Encryption Unit 105

In accordance with an instruction by the transmission control unit 104, the stream encryption unit 105 reads accompanying information corresponding to a content selected by the user from the accompanying information storage unit 113, and receives information stored in a header portion of a packet from the Nonce information generation unit 106. The stream encryption unit 105 generates a content key with use of the E-EMI, Nonce information contained in the received header portion, and an exchange key which has been shared with the communication party device in the AKE. Content key generation are detailed in the Non-Patent Literature 1, and accordingly description thereof is omitted here.

Also, the stream encryption unit 105 reads, from the stream storage unit 112, a plurality of pieces of unit data of the content designated by the transmission control unit 104 for each unit length of encryption. The stream encryption unit 105 encrypts the read pieces of unit data with use of the respective content keys based on the encryption algorithm, thereby to generate a plurality of pieces of encrypted unit data. Here, the encryption algorithm is the AES (Advanced Encryption Standard), for example. Furthermore, the stream encryption unit 105 combines the header portion received from the Nonce information generation unit 106 and the data portion containing encrypted unit data to generate packets, and outputs the generated packets to the communication IF unit 111.

(7) Stream Analysis Unit 108

The stream analysis unit 108 receives the packets via the communication IF unit 111, separates each of the received packets into a header portion and a data portion, and extracts PCP-UR from Nonce information stored in the header portion of the packet. The stream analysis unit 108 judges whether a piece of encrypted unit data stored in the data portion of the packet is contained in a partial original content or a partial edited content, with use of a type flag stored in a reserved area of the extracted PCP-UR. Next, the stream analysis unit 108 outputs the piece of encrypted unit data stored in the data portion to the stream decryption unit 107, and instructs the stream decryption unit 107 to decrypt the piece of encrypted unit data stored in the data portion and record a piece of unit data resulted from the decryption into the stream storage unit 112. Also, the stream analysis unit 108 outputs, to the stream decryption unit 107, CA, E-EMI, Nonce information, and Content Length contained in the header portion of the packet.

Furthermore, the stream analysis unit 108 judges whether or not continuity of SNonces exists between each currently received packet and a packet that has been immediately previously received. The judgment is made as to whether or not continuity exists of SNonces between the currently received packet and the immediately previously received packet, by judging whether or not a difference of SNonces therebetween is equal to or less than the first threshold. Here, the first threshold is "1" as described above. When the difference is equal to or less than the first threshold, that is, when the difference is "0" or "1", the stream analysis unit 108 judges that continuity exists therebetween.

On the other hand, when the difference is greater than the first threshold, that is, when the difference is equal to or greater than "2", the stream analysis unit 108 judges that discontinuity exists. When the stream analysis unit 108 judges that discontinuity exists, the currently received packet is the top packet of a partial edited content or the top packet of a partial original content. Accordingly, it is proved that a switch has occurred from a partial edited content to a partial original content or from a partial original content to a partial edited content. This proves that the selected content contains a partial edited content. Also, the type flag indicates whether a partial content containing the piece of transfer data generated immediately after the switch is a partial original content or a partial edited content. This proves whether a partial content after the switch is a partial original content or a partial edited content. When judging that discontinuity exists, the stream analysis unit 108 sets a discontinuity flag to a value of "1", and writes information, into the accompanying information storage unit 113, indicating that the selected content contains a partial edited content. Furthermore, when judging that discontinuity exists, the stream analysis unit 108 writes, into the accompanying information storage unit 113, a position in the received partial content where the piece of transfer data generated immediately after the switch is located, as a point of the switch between the partial original content and the partial edited content.

Note that when the difference is equal to or less than the first threshold, the stream analysis unit 108 may judge that continuity exists. Also, when the difference is equal to or greater than the second threshold, the stream analysis unit 108 may judge that discontinuity exists. Here, the second threshold is greater than the first threshold, as described above.

While judging that continuity exists between SNonces of the received packets, the stream analysis unit 108 continues to instruct the stream decryption unit 107 to decrypt the pieces of encrypted unit data and record pieces of unit data resulted from the decryption. When judging that discontinuity of SNonces exists between the received packets, the stream analysis unit 108 separates Nonce information of a header portion contained in the received packet, which is discontinuous from a packet that has been immediately previously received, into PCP-UR and SNonce, and judges whether a type flag of content attribute information stored in a reserved area of the PCP-UR indicates a partial original content or a partial edited content. When judging that the type flag indicates that the partial content is a partial edited content, the stream analysis unit 108 stores the Nonce information in a memory area that is different from a memory area for storing Nonce information of a partial original content. Here, these memory areas are included in the stream analysis unit 108.

Next, the stream analysis unit 108 generates management information of accompanying information, writes the generated management information into the accompanying information storage unit 113, as a part of the accompanying information. The stream analysis unit 108 generates section detail information of the accompanying information with use of content attribute information stored in a reserved area of PCP-UR of the packet, and writes the generated section detail information into the accompanying information storage unit 113, as a part of the accompanying information.

Only when the top packet of the content is received, the stream analysis unit 108 sets the moved-content flag to indicate that the selected content is a moved content, and also sets the number of section detail information to a value of "1". Next, the stream analysis unit 108 generates management information containing the set moved-content flag and the set number of section detail information. Here, the stream analysis unit 108 does not set, in the management information, the items contained in the management information shown in FIG. 6 other than the moved-content flag and the number of section detail information. The stream analysis unit 108 writes the generated management information into the accompanying information storage unit 113, as a part of the accompanying information.

Also, when judging that a switch has occurred from a partial original content to a partial edited content, or when judging that a switch has occurred from a partial edited content to a partial original content, the stream analysis unit 108 overwrites the number of section detail information contained in the management information of the accompanying information stored in the accompanying information storage unit 113, by incrementing the number of section detail information by a value of "1".

Furthermore, when the top packet of the content is received, or when judging that a switch has occurred from a partial original content to a partial edited content, or when judging that a switch has occurred from a partial edited content to a partial original content, the stream analysis unit 108 extracts content attribute information stored in the reserved area of the PCP-UR. Then, the stream analysis unit 108 extracts a content identifier, content control information, and content move count information from the extracted content attribute information, and generates section management information containing the extracted content identifier, content control information, and content move count information. The section management information here does not set, in the section management information, the items contained in the section management information shown in FIG. 6 other than the content identifier, the content control information, and the content move count information. The stream analysis unit 108 generates section detail information containing the generated section management information, and writes the generated section detail information into the accompanying information storage unit 113 as a part of the accompanying information.

(8) Stream Decryption Unit 107

The stream decryption unit 107 receives pieces of encrypted unit data together with instructions for decryption and recording from the stream analysis unit 108. Also, the stream decryption unit 107 receives CA, E-EMI, Nonce information, and Content Length. The stream decryption unit 107 generates a content key based on the E-EMI, Nonce information, and an exchange key which has been shared with the communication party device in the AKE. Generation of content key is performed as described above. Next, the stream decryption unit 107 decrypts the received pieces of encrypted unit data based on a decryption algorithm indicated by the received CA to generate pieces of unit data, and writes the generated pieces of unit data into the stream storage unit 112. Here, the decryption algorithm is, for example, AES.

(9) Playback Control Unit 122, Stream Decoding Unit 123, and AV Output Unit 124

The playback control unit 122 controls content playback in accordance with user operations.

The playback control unit 122 instructs the accompanying information management unit 121 to read accompanying information of a content selected by the user from the accompanying information storage unit 113. The playback control unit 122 controls the stream decoding unit 123 and the AV output unit 124 based on the accompanying information sorted in the accompanying information management unit 121. As a result, the selected content is played back.

In accordance with the instruction by the playback control unit 122, the stream decoding unit 123 reads video audio stream data encoded in MPEG2-TS format from the stream storage unit 112, decodes the read video audio stream data to obtain video data and audio data, and outputs the decoded video data and audio data to the AV output unit 124.

The AV output unit 124 receives the video data and the data audio data from the stream decoding unit 123, and outputs the received video data and audio data to the display device 30.

(10) Accompanying Information Management Unit 121, Edition Control Unit 125, and Section Information Generation Unit 126

In response to a user operation, the accompanying information management unit 121 is notified of a content selected by the user via the user IF unit 114 and the playback control unit 122. The accompanying information management unit 121 reads accompanying information corresponding to the selected content from the accompanying information storage unit 113, and stores therein the read accompanying information. The accompanying information management unit 121 reads a moved-content flag contained in management information of the accompanying information. When the read moved-content flag indicates that the selected content is a moved content, the accompanying information management unit 121 notifies the edition control unit 125 of information indicating that the selected content is a moved content.

In response to a user operation, the edition control unit 125 and the section information generation unit 126 add, to one content, a partial content contained in another content, or modify a partial content contained in the one content via the user IF unit 114.

The edition control unit 125 receives, from the accompanying information management unit 121, the information indicating that the selected content is a moved content. Next, in response to a user operation, the edition control unit 125 receives, via the user IF unit 114, designation of section detail information of a piece of accompanying information indicating a partial content added to the content selected by the user among a plurality of pieces of accompanying information stored in the accompanying information storage unit 113. This partial content is contained in another content that is other than the content selected by the user. The other content is, for example, a content created by the user. Next, in response to a user operation, the edition control unit 125 receives, via the user IF unit 114, designation of a position in the moved content where the partial content is to be located. Then, the edition control unit 125 outputs, to the section information generation unit 126, the section detail information corresponding to the partial content and position information indicating the position in the moved content where the partial content is to be located.

Also, in response to a user operation, the edition control unit 125 partially modifies the video audio stream data stored in the stream storage unit 112 via the user IF unit 114, and overwrites the video audio stream data stored in the stream storage unit 112 with the video audio stream data after modification. The edition control unit 125 receives section detail information corresponding to the modified part from the accompanying information management unit 121, and outputs the received section detail information to the section information generation unit 126.

The section information generation unit 126 receives copyright information, section detail information, and position information of the modified part from the edition control unit 125. The section information generation unit 126 inserts or adds the received section detail information in a position indicated by the received position information, or overwrites section detail information corresponding to a part before edition with the received section detail information, or writes the received copyright information into the accompanying information. In this way, the accompanying information, which contains the section detail information which has been inserted, added, or overwritten, is recorded into the accompanying information storage unit 113.

2.3 Operations of Content Transmission/Reception System 50

The following describes operations of the content transmission/reception system 50.

(1) Content Move Operations (a)

Figure 10:
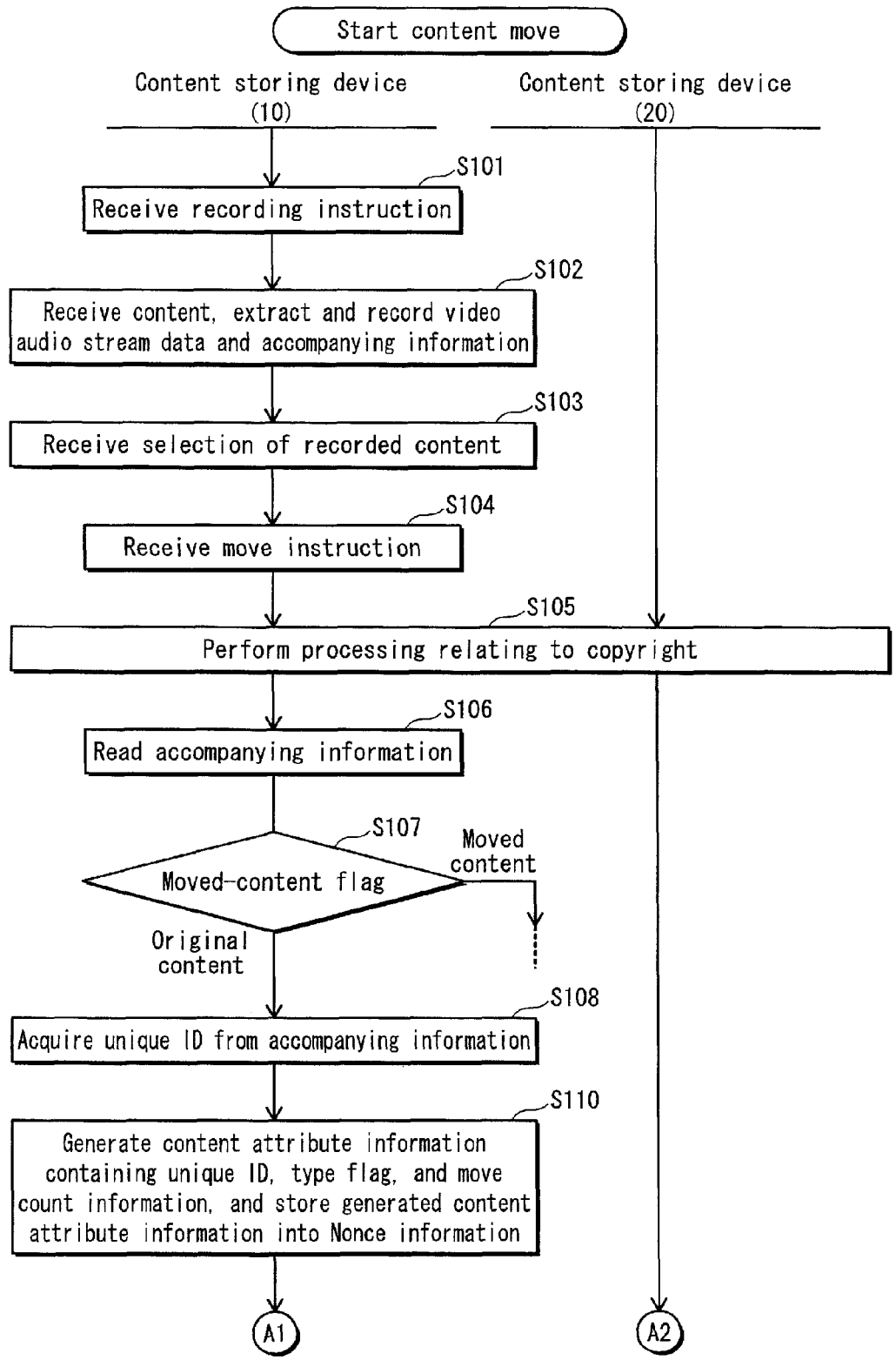
FIG. 10 shows a flowchart of operations performed by a content storing device 10 of recording a content into a stream storage unit 112 and an accompanying information storage unit 113 and moving the content to a content storing device 20, and continues to FIG. 11.
Figure 11:
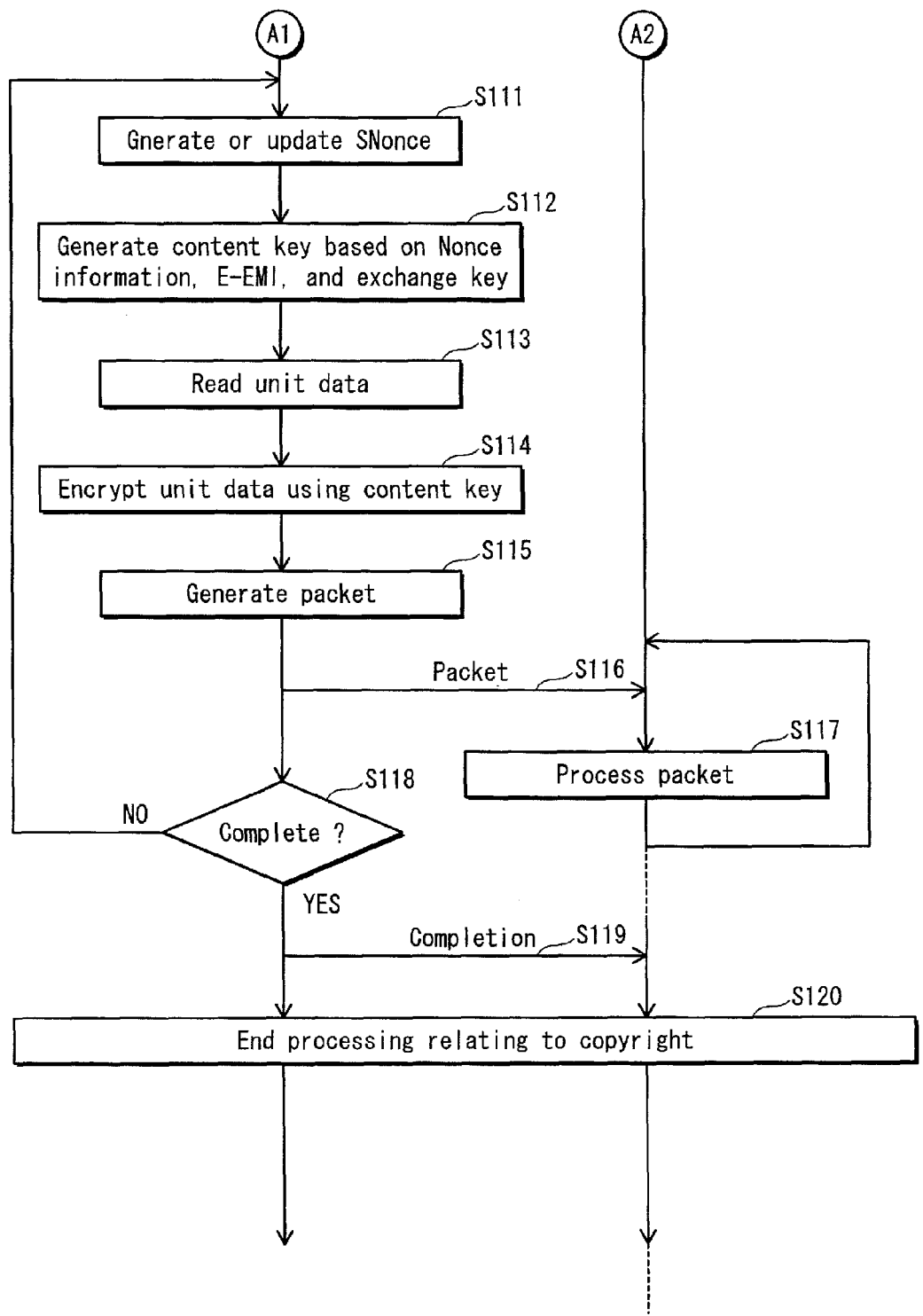
FIG. 11 continues from FIG. 10, and shows a flowchart of operations performed by the content storing device 10 of recording the content into the stream storage unit 112 and the accompanying information storage unit 113 and moving the content to the content storing device 20.

The following describes operations performed by the content storing device 10 of recording a content into the stream storage unit 112 and the accompanying information storage unit 113 and moving the content to the content storing device 20, with reference to flowcharts shown in FIG. 10-FIG. 11. The details are omitted here regarding content list exchange via UPnP, AKE using the DTCP-IP or the like.

In response to a user operation, the recording control unit 103 of the content storing device 10 receives an instruction to record a content that is a digital broadcast program via the user IF unit 114 (Step S101). Then, the channel selection unit 101 and the demultiplexer 102 of the content storing device 10 receive the content selected by the user, and extract accompanying information and video audio stream data from stream data of the received content, and write the extracted video audio stream data and accompanying information into the stream storage unit 112 and the accompanying information storage unit 113, respectively (Step S102).

Then, in response to a user operation, the transmission control unit 104 of the content storing device 10 receives selection of the recorded content via the user IF unit 114 (Step S103). In response to a user operation, the transmission control unit 104 receives an instruction to move the selected content to the content storing device 20 via the user IF unit 114 (Step S104).

Next, the respective authentication units 109 of the content storing devices 10 and 20 start processing relating to copyright. Specifically, the respective authentication units 109 of the content storing devices 10 and 20 perform, for example, authentication and key exchange therebetween (Step S105).

Next, the Nonce information generation unit 106 of the content storing device 10 reads the accompanying information corresponding to the content selected by the user from the accompanying information storage unit 113 (Step S106), and judges whether the content selected by the user is an original content or a moved content (Step S107). The subsequent description continues on the assumption that the content selected by the user is an original content here.

The Nonce information generation unit 106 of the content storing device 10 acquires a content identifier that is a unique ID of the content from section management information contained in the accompanying information. Note that the unique ID is used for checking whether or not a content, which has been moved back to the content storing device 10, is recorded in an HDD of the content storing device 10. Also, in the case where the number of times of moving the content is designated by a user's move instruction, the unique ID and content move count information are transmitted to the content storing device 20. The Nonce information generation unit 106 of the content storing device 10 generates content attribute information containing a type flag indicating that the selected content is an original content, the acquired content identifier that is the unique ID, and the content move count information indicating the designated number of times of moving the content, and stores the generated content attribute information into Nonce information (Step S110).

The Nonce information generation unit 106 of the content storing device 10 generates or updates an SNonce (Step S111). In the case where an SNonce is generated, the stream encryption unit 105 of the content storing device 10 generates a content key based on Nonce information, the E-EMI, and the exchange key (Step S112), reads pieces of unit data from the video audio stream data stored in the stream storage unit 112 (Step S113), and encrypts the read pieces of unit data to generate pieces of encrypted unit data (Step S114), combines a header portion in which the Nonce information is sorted with a data portion containing encrypted unit data to generate a packet (PCP) (Step S115). The communication IF unit 111 of the content storing device 10 transmits the generated packet to the content storing device 20 via the local network 40 (Step S116).

The communication IF unit 111 of the content storing device 20 receives the packet (Step S116), and the content storing device 20 performs processing on the received packet (Step S117).

The content storing device 10 repeats Steps S111-S116 until transmission of the content completes (Step S118). When transmission of the content completes (Step S118), the communication IF unit 111 of the content storing device 10 transmits a packet indicating completion of content transmission to the content storing device 20 (Step S119).

Next, the respective authentication units 109 of the content storing devices 10 and 20 end the processing relating to copyright. Specifically, the authentication units 109 update digital copy control information of the accompanying information stored in the respective accompanying information storage unit 113 (Step S120).

The above description mainly states the operations of moving the content from the content storing device 10 to the content storing device 20, and does not state a case where an SNonce is to be generated and a case where an SNonce is to be updated. The details are described below.

(2) Content Move Operations (b)

Figure 12:
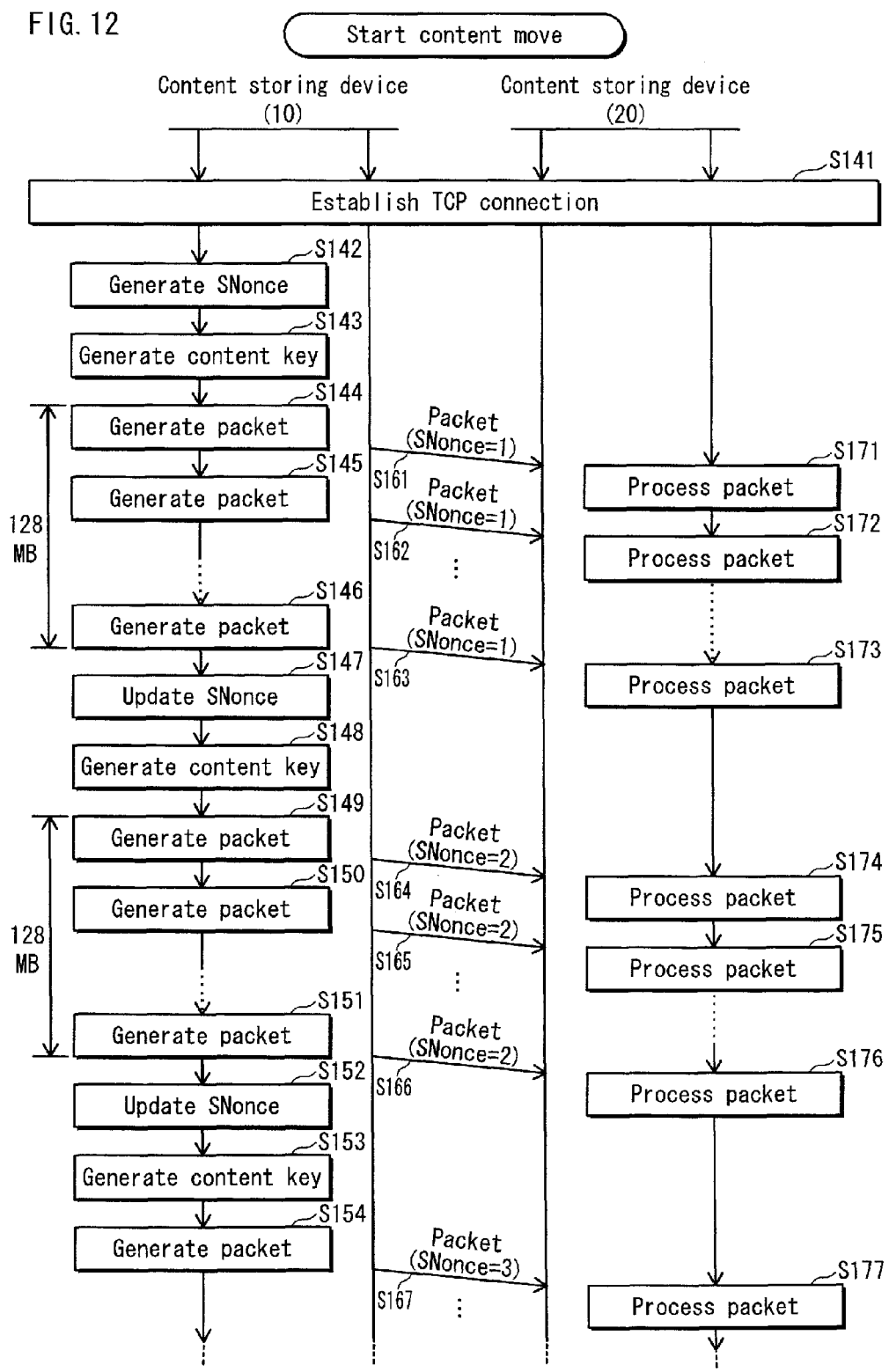
FIG. 12 shows a flowchart of a case where an SNonce is to be generated and a case where an SNonce is to be updated in operations of moving a content from the content storing device 10 to the content storing device 20.

The following describes a case where an SNonce is to be generated and a case where an SNonce is to be updated in the operations of moving a content from the content storing device 10 to the content storing device 20, with reference to a flowchart shown in FIG. 12.

When TCP connection is established between the respective communication IF units 111 of the content storing devices 10 and 20 (Step S141), the Nonce information generation unit 106 of the content storing device 10 generates an SNonce to generate Nonce information (Step S142). Here, the generated SNonce has a value of "1", for example.

Next, the stream encryption unit 105 of the content storing device 10 generates a content key based on Nonce information, the E-EMI, and the exchange key (Step S143), reads a piece of unit data from video audio stream data stored in the stream storage unit 112, encrypts the read piece of unit data to generate a piece of encrypted unit data with use of the generated content key, and combines a header portion in which the Nonce information is stored with a data portion containing the piece of encrypted unit data to generate a packet (PCP) (Step S144). The stream encryption unit 105 repeats packet generation as described above (Steps S145, . . . , S146). Here, the generated packets each contain an SNonce having a value of "1".

The communication IF unit 111 of the content storing device 10 transmits the generated packets (each containing an SNonce having a value of "1") to the content storing device 20 via the local network 40 (Steps S161, S162, . . . , S163).

The communication IF unit 111 of the content storing device 20 receives the packets (Steps S161, S162, . . . , S163), and the content storing device 20 performs processing on the received packets (Steps S171, S172, . . . , S173).

The pieces of encrypted unit data contained in the data portions of all the generated packets that have been generated so far have a total length of 128 MB. Encryption is performed with use of the encryption algorithm that equalizes the length of plaintext and the length of ciphertext. Accordingly, all the pieces of unit data that has been encrypted so far have the total length of 128 MB.

When the total length of all the pieces of unit data that has been encrypted exceeds 128 MB, the Nonce information generation unit 106 of the content storing device 10 updates the SNonce of the packet that has been generated to generate Nonce information of a packet immediately after the excess (Step S147). Here, the updated SNonce has a value of "2", for example.

Next, the stream encryption unit 105 of the content storing device 10 generates a content key based on Nonce information, the E-EMI, and the exchange key (Step S148), and repeats packet generation in the same way as described above (Steps S149, S150, . . . , S151). Here, the generated packets each contain an SNonce having a value of "2".

The communication IF unit 111 of the content storing device 10 transmits the generated packets (each containing an SNonce having a value of "2") to the content storing device 20 via the local network 40 (Steps S164, S165, . . . , S166).

The communication IF unit 111 of the content storing device 20 receives the packets (Steps S164, S165, . . . , S166), and the content storing device 20 performs processing on the received packets (Steps S174, S175, . . . , S176).

When the total length of all the pieces of unit data that has been encrypted exceeds 128 MB in Steps S149-S151, the Nonce information generation unit 106 of the content storing device 10 updates the SNonce of the packet that has been generated to generate Nonce information of a packet immediately after the excess (Step S152). Here, the updated SNonce has a value of "3", for example.

Next, the stream encryption unit 105 of the content storing device 10 generates a content key based on Nonce information, the E-EMI, and the exchange key (Step S153), and repeats packet generation (Steps S154, . . . ) in the same way as described above. Here, the generated packets each contain an SNonce having a value of "3".

The communication IF unit 111 of the content storing device 10 transmits the generated packets (each containing an SNonce having a value of "3") to the content storing device 20 via the local network 40 (Steps S167, . . . ).

The communication IF unit 111 of the content storing device 20 receives the packets (Steps S167, . . . ), and the content storing device 20 performs processing on the received packets (Steps S177, . . . ).

(3) Operations of SNonce Generation and Update

Figure 13:
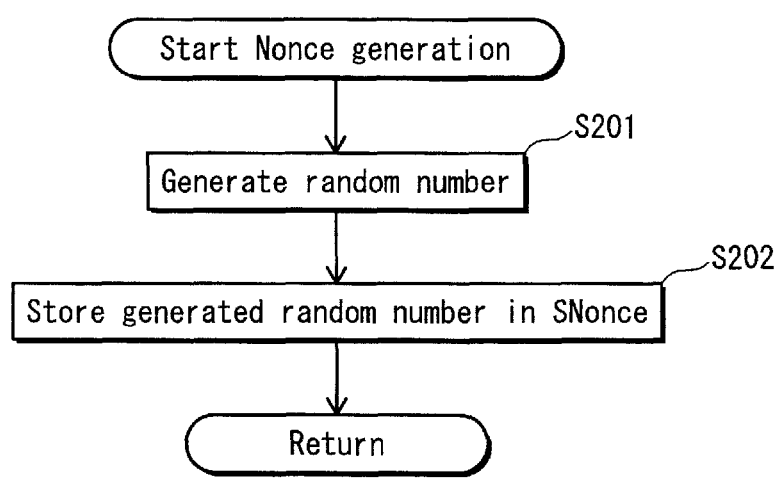
FIG. 13 shows a flowchart of operations of SNonce generation.

Here, operations of SNonce generation are described with respect to a flowchart shown in FIG. 13.

The Nonce information generation unit 106 of the content storing device 10 generates a random value (Step S201), and sets the generated random value to an SNonce (Step S202).

Figure 14:
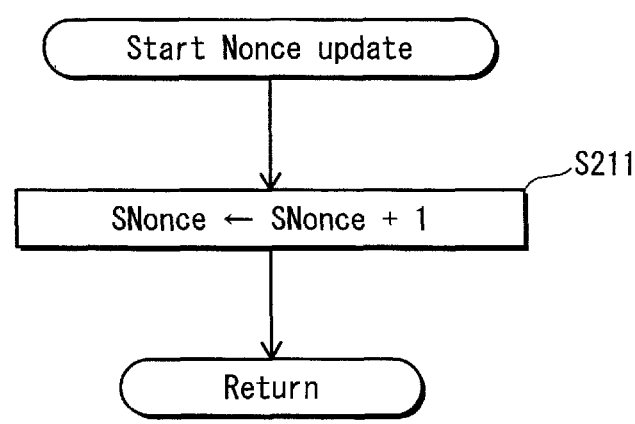
FIG. 14 shows a flowchart of operations of SNonce update.

Also, operations of SNonce update are described with respect to a flowchart shown in FIG. 14.

The Nonce information generation unit 106 of the content storing device 10 updates an SNonce by increment the SNonce by a value of "1" (Step S211).

(4) Processing on Packets in Reception Side

Figure 15:
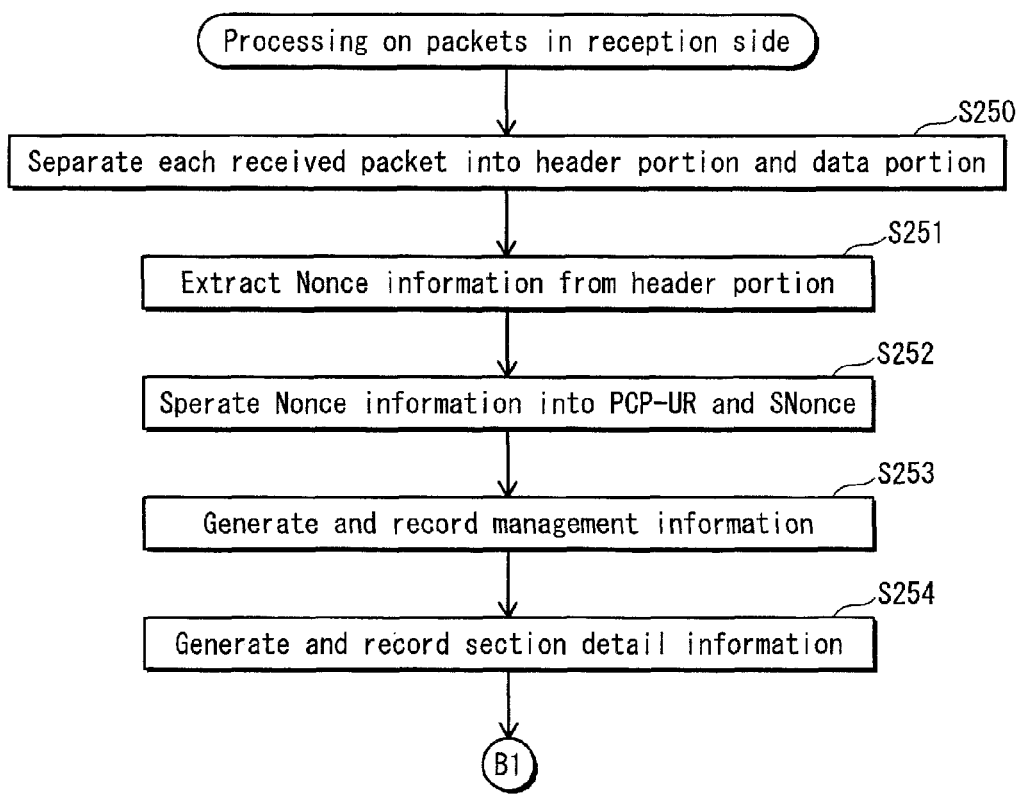
FIG. 15 shows a flowchart of processing on packets in a reception side, and continues to FIG. 16.
Figure 16:
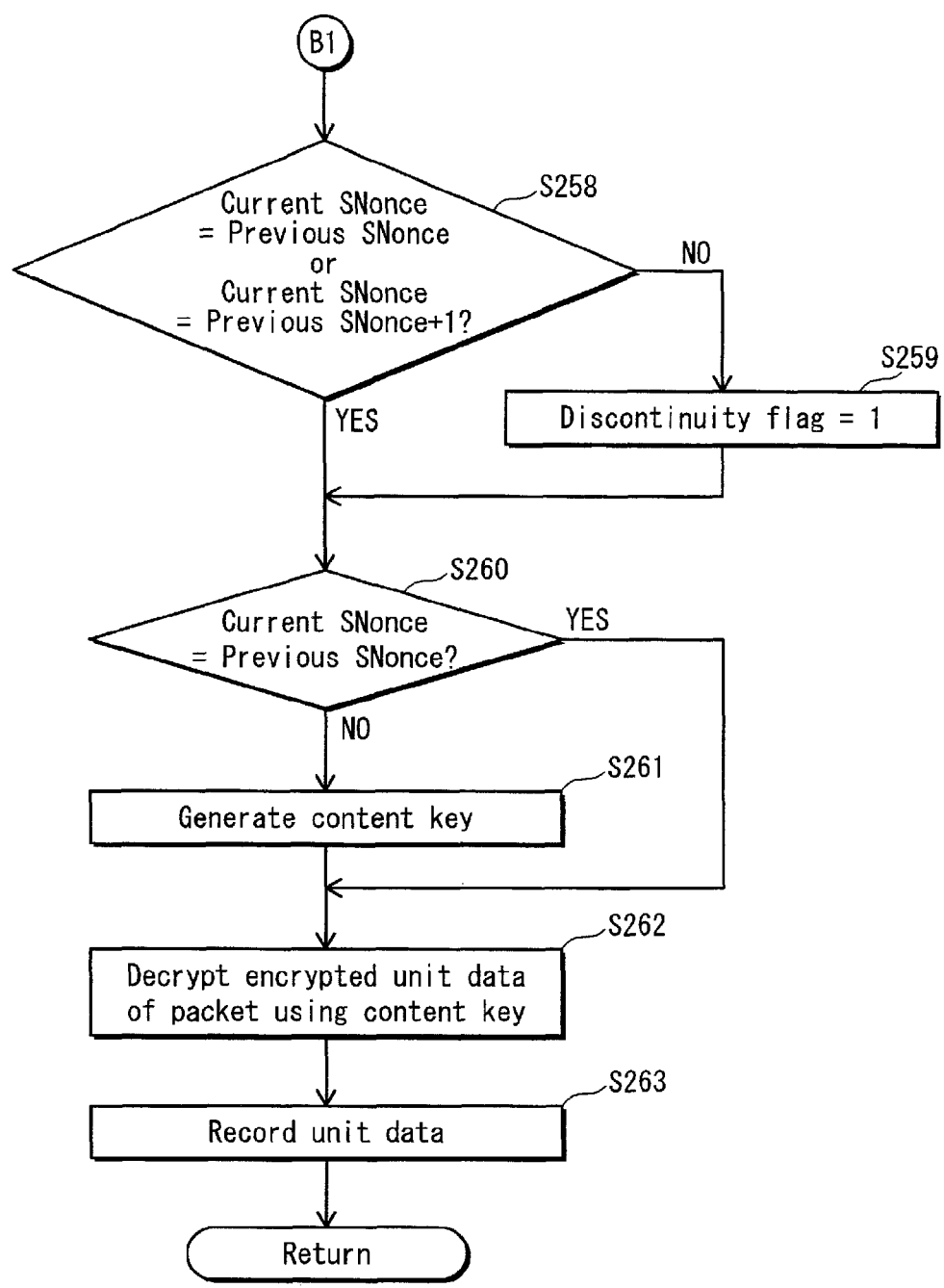
FIG. 16 continues from FIG. 15, and shows a flowchart of processing on packets in the reception side.

Here, processing on packets performed in the reception side is described with reference to flowcharts shown in FIG. 15 and FIG. 16. The processing on packets described here details the processing on packets in Step S117 shown in FIG. 11 and Steps S171, . . . , S177 shown in FIG. 12.

The stream analysis unit 108 of the content storing device 20 separates each of packets received via the communication IF unit 111 into a header portion and a data portion (Step S250), extracts Nonce information from the header portion, and separates the extracted Nonce information into PCP-UR and SNonce (Step S252).

The stream analysis unit 108 generates management information, and writes the generated management information into the accompanying information storage unit 113 as a part of accompanying information (Step S253). The stream analysis unit 108 generates section detail information, and writes the generated section detail information into the accompanying information storage unit 113 as a part of the accompanying information (Step S254).

Then, the stream analysis unit 108 compares an SNonce contained in the Nonce information of a currently received packet with an SNonce contained in Nonce information of a packet that has been immediately previously received, thereby to judge whether or not a difference therebetween is equal to or less than the first threshold (Step S258). When the difference is greater than the first threshold (Step S258: NO), the stream analysis unit 108 sets the discontinuity flag to a value of "1" (Step S259). In the difference is equal to or less than the first threshold (Step S258: YES), the stream analysis unit 108 performs nothing.

When the difference is "1" (Step S260: NO), the stream decryption unit 107 generates a content key based on Nonce information, the E-EMI, and the exchange key (Step S261).

Then, the stream decryption unit 107 decrypts a piece of encryption data contained in the currently received packet with use of the generated content key based on the decryption algorithm to generate a piece of unit data (Step S262), and writes the generated piece of unit data into the stream storage unit 112 (Step S263).

(5) Operations of Moving Content, which has been Moved from Content Storing Device 10 to Content Storing Device 20, Back to Content Storing Device 10

Figure 17:
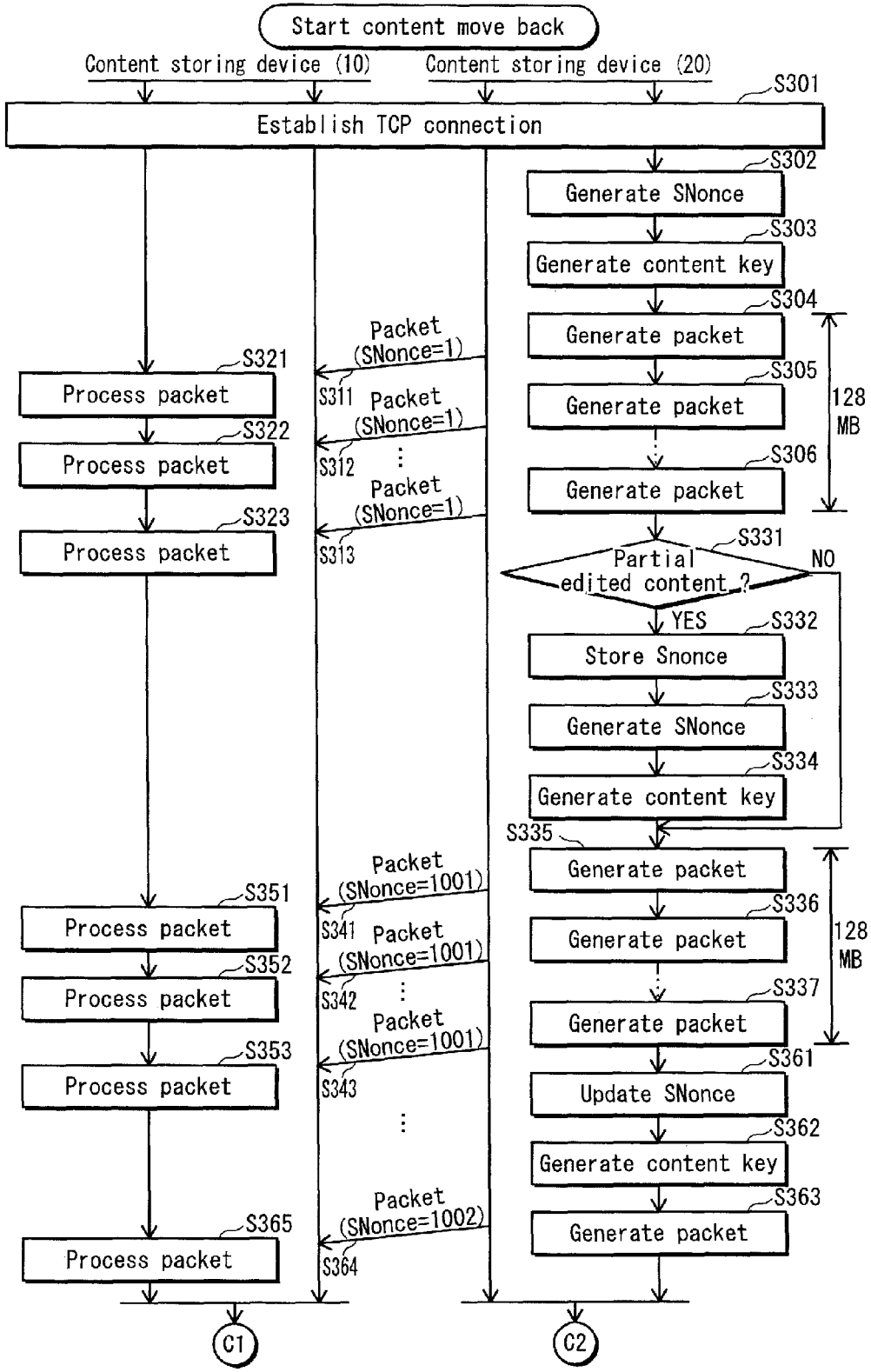
FIG. 17 shows a flowchart of operations of moving a content, which has been moved from the content storing device 10 to the content storing device 20, back to the content storing device 10, continuing to FIG. 18.
Figure 18:
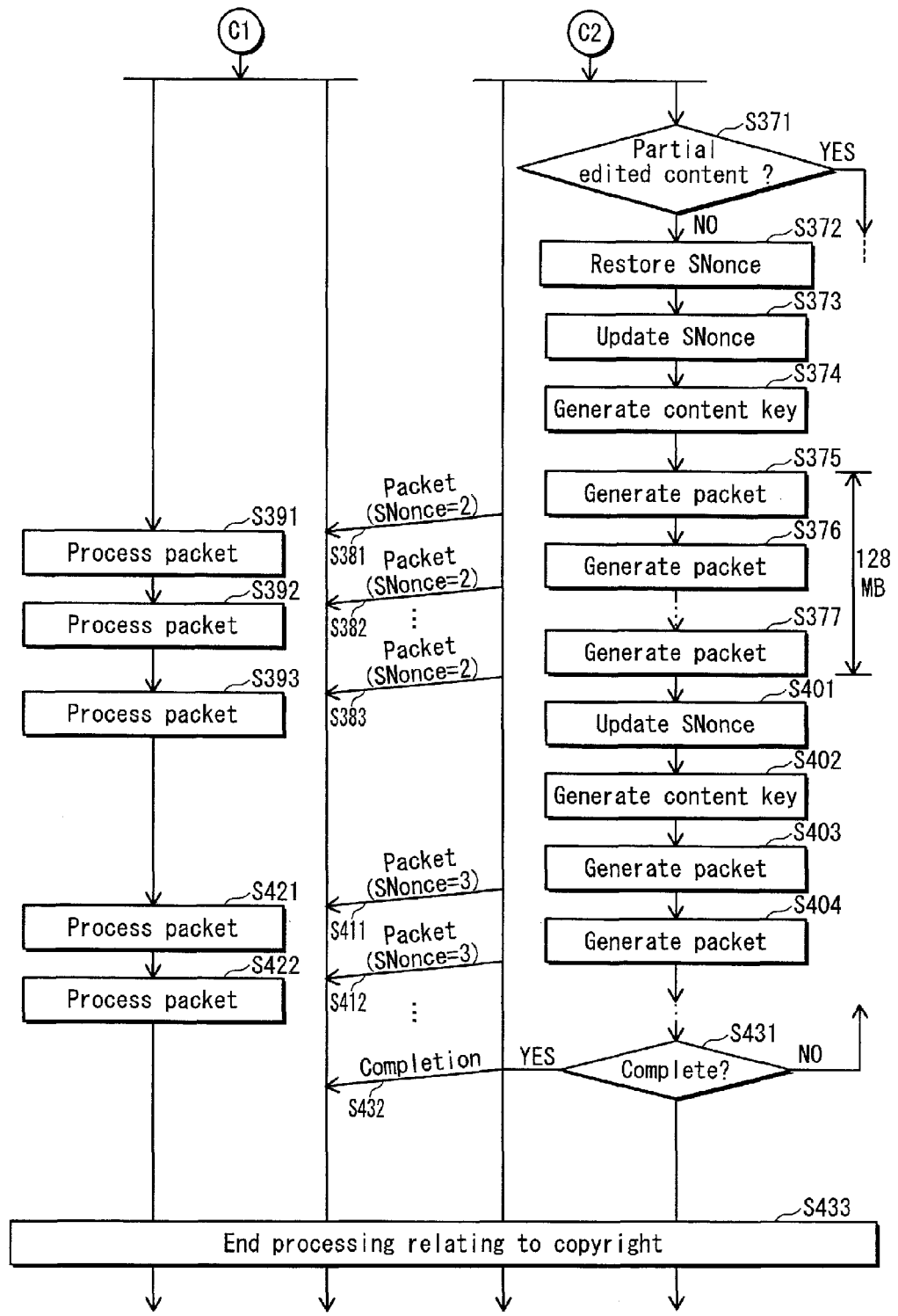
FIG. 18 continues from FIG. 17, and shows a flowchart of operations of moving the content, which has been moved from the content storing device 10 to the content storing device 20, back to the content storing device 10.

The following describes operations of moving a content, which has been moved from the content storing device 10 to the content storing device 20, back to the content storing device 10, with reference to flowcharts shown in FIG. 17 and FIG. 18.

The operations of moving the content back to the content storing device 10 are the same as Steps S104-S120 shown in FIG. 10 and FIG. 11. Also, these operations are similar to Steps S141-S177 shown in FIG. 12.

The operations shown in FIG. 17 and FIG. 18 differ from the operations shown in FIG. 12 mainly in how to generate an SNonce in the case where a content contains a partial edited content.

Firstly, the content storing device 20 searches whether or not a device to which a moved content is to be moved back can operate, with use of a device discovery protocol defined by the UPnP. Next, in response to the search performed by the content storing device 20, the content storing device 10 transmits to the content storing device 20, as a device response, a response message indicating that the moved content can be moved back. Move back of the moved content starts when the user of the content storing device 20 selects the content storing device 10 among discovered devices. In this way, the device to which the moved content is to be moved back is determined by the user's designation.

Next, when TCP connection is established between the respective communication IF units 111 of the content storing devices 10 and 20 (Step S301), the Nonce information generation unit 106 of the content storing device 20 generates an SNonce to generate Nonce information (Step S302). Here, the generated SNonce has a value of "1", for example.

Next, the stream encryption unit 205 of the content storing device 20 generates a content key based on the Nonce information, E-EMI, and the exchange key (Step S303), reads a piece of unit data from video audio stream data stored in the stream storage unit 112, encrypts the read piece of unit data to generate a piece of encrypted unit data with use of the generated content key, and combines a header portion in which the Nonce information is stored with a data portion containing the piece of encrypted unit data to generate a packet (PCP) (Step S304). The stream encryption unit 105 repeats packet generation (Steps S305, . . . , S306) as described above. Here, the generated packets each contain an SNonce having a value of "1".

The communication IF unit 111 of the content storing device 20 transmits the generated packets (each containing an SNonce having a value of "1") to the content storing device 10 via the local network 40 (Steps S311, S312, . . . , S313).

The communication IF unit 111 of the content storing device 10 receives the packets (Steps S311, S313, . . . , S313), and the content storing device 10 performs processing on the received packets (Steps S321, S322, . . . , S323).

The pieces of encrypted unit data contained in the data portions of all the generated packets that have been generated so far have a total length of 128 MB. Encryption is performed with use of the encryption algorithm that equalizes the length of plaintext and the length of ciphertext. Accordingly, all the pieces of unit data that has been encrypted so far have the total length of 128 MB.

Next, the stream encryption unit 105 of the content storing device 20 judges whether each of the read pieces of unit data is contained in a partial edited content or a partial original content (Step S331). This judgment is made with use of a type flag contained in section management information of section detail information of the accompanying information. The type flag indicates whether the read piece of unit data is contained in a partial edited content or a partial original content.

When judging that the read piece of unit data is contained in a partial original content (Step S331: NO), the Nonce information generation unit 106 of the content storing device 20 performs nothing When judging that the read piece of unit data is contained in a partial edited content (Step S331: YES), the Nonce information generation unit 106 temporarily stores therein an SNonce that has been immediately previously generated (Step S332), and then generates an SNonce to generate Nonce information (Step S333). Here, the generated SNonce has a value of "1001", for example. Next, the stream encryption unit 105 of the content storing device 20 generates a content key based on the Nonce information, the E-EMI, and the exchange key (Step S234), and then repeats packet generation (Steps S335, S336, . . . , S337). Here, the generated packets each contain an SNonce having a value of "1001".

Then, the communication IF unit 111 of the content storing device 20 transmits the generated packets (each containing an SNonce having a value of "1001") to the content storing device 10 via the local network 40 (Steps S341, S342, . . . , S343).

The communication IF unit 111 of the content storing device 10 receives the packets (Steps S341, S342, . . . , S343), and the content storing device 10 performs processing on the received packets (Steps S351, S352, ..., S353).

When the total length of all the pieces of unit data that has been encrypted exceeds 128 MB in Steps S335-S337, the Nonce information generation unit 106 of the content storing device 20 updates the SNonce of the packet that has been generated to generate Nonce information of a packet immediately after the excess (Step S361). Here, the updated SNonce has a value of "1002", for example.

Next, the stream encryption unit 105 of the content storing device 20 generates a content key based on the Nonce information, the E-EMI, and the exchange key (Step S362), and repeats packet generation in the same way as described above (Steps S363, ...). Here, the generated packets each contain an SNonce having a value of "1002".

The communication IF unit 111 of the content storing device 20 transmits the generated packets (each containing an SNonce having a value of "1002") to the content storing device 10 via the local network 40 (Steps S364, ...).

The communication IF unit 111 of the content storing device 10 receives the packets (Steps S364, ...), and the content storing device 10 performs processing on the received packets (Steps S365, ...).

Next, the stream encryption unit 105 of the content storing device 20 judge whether or not each of the read pieces of unit data is contained in a partial edited content (Step S371).

When judging that the read piece of unit data is contained in a partial edited content (Step S371: YES), subsequent processing is the same as that performed as a result of the judgment in Step S331: YES, and accordingly description thereof is omitted here. When judging that the read piece of unit data is contained in a partial original content (Step S371: NO), the Nonce information generation unit 106 of the content storing device 20 reads the SNonce temporarily stored in Step S332 (Step S372). Then, the Nonce information generation unit 106 updates the read SNonce to generate Nonce information of the top packet of the piece of unit data (Step S373). Here, the updated SNonce has a value of "2", for example. Next, the stream encryption unit 105 of the content storing device 20 generates a content key based on the Nonce information, the E-EMI, and the exchange key (Step S374), and then repeats packet generation (Steps S375, S376, ..., S377). Here, the generated packets each contain an SNonce having a value of "2".

The communication IF unit 111 of the content storing device 20 transmits the generated packets (each containing an SNonce having a value of "2") to the content storing device 10 via the local network 40 (Steps S381, S382, ..., S383).

The communication IF unit 111 of the content storing device 10 receives the packets (Steps S381, S382, ..., S383), and the content storing device 10 performs processing on the received packets (Steps S391, S392, ..., S393).

When the total length of all the pieces of unit data that has been encrypted exceeds 128 MB in Steps S375-S377, the Nonce information generation unit 106 of the content storing device 20 updates the SNonce of the packet that has been generated to generate Nonce information of a packet immediately after the excess (Step S401). Here, the updated SNonce has a value of "3", for example.

Next, the stream encryption unit 105 of the content storing device 10 generates a content key based on the Nonce information, the E-EMI, and the exchange key (Step S402), and repeats packet generation in the same way as described above (Steps S403, S404, ...). Here, the generated packets each contain an SNonce having a value of "3".

The communication IF unit 111 of the content storing device 20 transmits the generated packets (each containing an SNonce having a value of "3") to the content storing device 10 via the local network 40 (Steps S411, S412, ...).

The communication IF unit 111 of the content storing device 10 receives the packets (Steps S411, S412, ...), and the content storing device 10 performs processing on the received packets (Steps S421, S422, ...).

When completing encryption of all the pieces of unit data of the content (Step S431: YES), the stream encryption unit 105 of the content storing device 20 generates a packet indicating completion of unit data encryption. The communication IF unit 111 transmits the packet indicating completion of unit data encryption to the content storing device 10 (Step S432).

Next, the content storing devices 10 and 20 end the processing relating to copyright (Step S433).

3. Other Modification Examples

Although the present invention has been described based on the above embodiments, the present invention is, of course, not limited to the above embodiments. The present invention includes the following modifications.

(1) In the above embodiment 2, in the case where a content, which has been moved from the content storing device 10 to the content storing device 20, is moved back to the content storing device 10, the content storing device 10 may perform as follows.

The content storing device 10 checks whether or not any decrypted stream section is stored in the stream storage unit 112 with use of accompanying information stored in the accompanying information storage unit 113. If any decrypted stream section is stored, the content storing device 10 does not store a stream section obtained by decrypting stream data into the stream storage unit 112. On the other hand, if any decrypted stream section is not stored, the content storing device 10 writes a stream section obtained by decrypting stream data into the stream storage unit 112. Furthermore, when the stored decrypted stream section is a partial edited stream section, the content storing device 10 generates section detail information corresponding to the decrypted stream section, and writes the generated section detail information into the accompanying information storage unit 113.

(2) In the above embodiment 2, the content storing devices 10 and 20 have the same structure. Alternatively, the following may be employed.

In the embodiment 2, the content storing device 10 does not perform content edition, and accordingly does not include the edition control unit 125 and the section information generation unit 126.

Also, in the embodiment 2, the content storing device 20 does not receive any content that is a broadcasting program, and accordingly does not include the channel selection unit 101, the demultiplexer 102, and the recording control unit 103.

(3) In the above embodiment 2, when setting the discontinuity flag to a value of "1" with respect to a selected content, the stream analysis unit 108 may add copy prohibition information indicating prohibition of copying the content to accompanying information corresponding to the selected content, and write the accompanying information into the accompanying information storage unit 113. Alternatively, the stream analysis unit 108 may add prohibition information indicating prohibition of moving the content, accompanying information corresponding to the content, and writes the accompanying information into the accompanying information storage unit 113. Further alternatively, the stream analysis unit 108 may newly set a content identifier other than a content identifier assigned to an original content, assign the newly set content identifier to the selected content, and write the accompanying information into the accompanying information storage unit 113.

(4) Each of the above devices is specifically a computer system composed of a microprocessor, a ROM, a RAM, a hard disk unit, a display unit, a keyboard, a mouse, and so on. The RAM or the hard disk unit stores therein a computer program. Here, the computer program is composed of combinations of instruction codes each indicating an instruction to a computer so as to achieve predetermined functions. Functions of each of the devices are achieved by the microprocessor operating in accordance with the computer program. In other words, the microprocessor reads the instructions contained in the computer program one by one, decodes the read instructions, and operates in accordance with a result of the decoding.

Note that each of the devices is not limited to a computer system including all of a microprocessor, a ROM, a RAM, a hard disk unit, a display unit, a keyboard, a mouse, and so on. Each of the devices may be a computer system including part of these elements.

Furthermore, owing to the microprocessor operating in accordance with the instructions contained in the computer program stored in the RAM or the hard disk unit, it is possible to make the computer program and the microprocessor appear as if the computer program and the microprocessor constituted a single hardware circuit and this hardware circuit are operating.

(5) Part or all of the structural elements of each of the above devices may be implemented as a single system LSI (Large Scale Integration). The system LSI is a super multifunctional LSI manufactured by integrating a plurality of structural units onto a single chip, and specifically is a computer system including a microprocessor, a ROM, a RAM and so on. The RAM stores therein a computer program. Functions of the system LSI are achieved by the microprocessor operating in accordance with the computer program.

Also, each of the structural elements of each of the above devices may be separately integrated into a single chip, or integrated into a single chip including part or all of the structural elements. Furthermore, the LSI may be called an IC, a system LSI, a super LSI, and an ultra LSI, depending on the integration degree.

A method of circuit integration is not limited to an LSI, and may be realized by a dedicated circuit or a general processor. Furthermore, it may be possible to use an FPGA (Field Programmable Gate Array) programmable after manufacturing LSIs or a reconfigurable processor in which connection and setting of a circuit cell inside an LSI is reconfigurable after manufacturing LSIs.

Furthermore, when a new technology for forming integrated circuits that replaces LSIs becomes available as a result of progress in semiconductor technology or semiconductor-derived technologies, functional blocks may be integrated using such technology. One possibility lies in adaptation of biotechnology.

(6) Part or all of the structural elements of each of the above devices may be composed of an IC card detachable from the device or a single module. The IC card or the module is a computer system composed of a microprocessor, a ROM, a RAM, and so on. The IC card or the module may include the above super multifunctional LSI. Functions of the IC card or the module are achieved by the microprocessor operating in accordance with a computer program. The IC card or the module may be each tamper-resistant.

(7) The present invention may be the above-described method. Also, the present invention may be a computer program for realizing the methods by a computer or a digital signal each composed of the computer program.

Furthermore, the present invention may be a computer-readable recording medium such as a flexible disk, a hard disk, a CD-ROM, an MO, a DVD, a DVD-ROM, a DVD-RAM, a BD, and a semiconductor memory, which records therein the computer program or the digital signal. Furthermore, the present invention may be the computer program or the digital signal each recorded in the recording medium.

Also, the present invention may be the computer program or the digital signal transmitted via an electric communication network, a wireless or wired communication network, a network such as the Internet, data broadcasting, or the like.

Furthermore, the present invention may be a computer system that includes a microprocessor and a memory. The memory may store therein the computer program, and the microprocessor may operate in accordance with the computer program.

Furthermore, the present invention may be implemented by another computer system, by transmitting the computer program or the digital signal each recorded in the recording medium to the other computer system, or by transmitting the computer program or the digital signal to the other computer system via the network.

(8) The present invention may be structured as follows.

One aspect of the present invention is a content transmission/reception system that includes a content transmission device and a content reception device. The content transmission device edits an original content, which has been moved, to obtain an edited content, and moves the edited content back. The content reception device receives the edited content. The content transmission device comprises: a storage circuit that stores therein an edited content composed of a partial original content and a partial edited content, the partial original content being a part of an original content, the partial edited content being a part obtained by editing a part of the original content; a division circuit that divides each of the partial original content and the partial edited content to generate a plurality of pieces of transfer data; an encryption circuit that generates a nonce value with respect to each of the pieces of transfer data, such that (i) discontinuity exists between a nonce value generated with respect to one of the pieces of transfer data and a nonce value that has been immediately previously generated, the one piece of transfer data being generated immediately after a switch between the partial original content and the partial edited content, and (ii) continuity exists between a nonce value generated with respect to each of the pieces of transfer data excepting the one piece of transfer data and a nonce value that has been immediately previously generated, generates a key based on each of the generated nonce values, and encrypts a corresponding one of the pieces of transfer data with use of the generated key, thereby to obtain a plurality of pieces of encrypted transfer data; and a transmission circuit that transmits the pieces of encrypted transfer data together with the respective nonce values in order of generation of the pieces of encrypted transfer data. The content reception device comprises: a reception circuit that sequentially receives, as a content, the pieces of encrypted transfer data together with the respective nonce values; a decryption circuit that generates a key based on each of the received nonce values, and decrypts a corresponding one of the received pieces of encrypted transfer data with use of the generated key, thereby to obtain a plurality of pieces of transfer data; a judgment circuit that judges, with respect to each of the received nonce values, whether continuity or discontinuity exists between the received nonce value and a nonce value that has been immediately previously received; and a writing circuit that sequentially writes, as the content, the obtained pieces of transfer data into a recording medium, and when the judgment unit judges that discontinuity exists therebetween, writes, into the recording medium, information indicating that the received content contains a partial edited content.

Another aspect of the present invention is an integrated circuit incorporated into a content transmission device that edits an original content, which has been moved, to obtain an edited content, and moves the edited content back. The integrated circuit comprises: a storage circuit that stores therein an edited content composed of a partial original content and a partial edited content, the partial original content being a part of an original content, the partial edited content being a part obtained by editing a part of the original content; a division circuit that divides each of the partial original content and the partial edited content to generate a plurality of pieces of transfer data; an encryption circuit that generates a nonce value with respect to each of the pieces of transfer data, such that (i) discontinuity exists between a nonce value generated with respect to one of the pieces of transfer data and a nonce value that has been immediately previously generated, the one piece of transfer data being generated immediately after a switch between the partial original content and the partial edited content, and (ii) continuity exists between a nonce value generated with respect to each of the pieces of transfer data excepting the one piece of transfer data and a nonce value that has been immediately previously generated, generates a key based on each of the generated nonce values, and encrypts a corresponding one of the pieces of transfer data with use of the generated key, thereby to obtain a plurality of pieces of encrypted transfer data; and a transmission circuit that transmits the pieces of encrypted transfer data together with the respective nonce values in order of generation of the pieces of encrypted transfer data.

A yet another aspect of the present invention is an integrated circuit incorporated into a content reception device that receives an edited content. The integrated circuit comprises: a reception circuit that sequentially receives, as a content, the pieces of encrypted transfer data together with the respective nonce values; a decryption circuit that generates a key based on each of the received nonce values, and decrypts a corresponding one of the received pieces of encrypted transfer data with use of the generated key, thereby to obtain a plurality of pieces of transfer data; a judgment circuit that judges, with respect to each of the received nonce values, whether continuity or discontinuity exists between the received nonce value and a nonce value that has been immediately previously received; and a writing circuit that sequentially writes, as the content, the obtained pieces of transfer data into a recording medium, and when the judgment unit judges that discontinuity exists therebetween, writes, into the recording medium, information indicating that the received content contains a partial edited content.

A further another aspect of the present invention is a content transmission device that edits an original content, which has been moved, to obtain an edited content, and moves the edited content back. The content transmission device comprises: a memory unit stores therein a computer program composed of a combination of a plurality of computer instructions; and a processor that reads the computer instructions one by one from the computer program stored in the memory unit. The memory unit further stores therein an edited content composed of a partial original content that is a part of an original content and a partial edited content that is a part obtained by editing a part of the original content. The computer program causes a computer to execute: a division step of dividing each of the partial original content and the partial edited content to generate a plurality of pieces of transfer data; an encryption step of generating a nonce value with respect to each of the pieces of transfer data, such that (i) discontinuity exists between a nonce value generated with respect to one of the pieces of transfer data and a nonce value that has been immediately previously generated, the one piece of transfer data being generated immediately after a switch between the partial original content and the partial edited content, and (ii) continuity exists between a nonce value generated with respect to each of the pieces of transfer data excepting the one piece of transfer data and a nonce value that has been immediately previously generated, generating a key based on each of the generated nonce values, and encrypting a corresponding one of the pieces of transfer data with use of the generated key, thereby to obtain a plurality of pieces of encrypted transfer data; and a transmission step of transmitting the pieces of encrypted transfer data together with the respective nonce values in order of generation of the pieces of encrypted transfer data.

A yet another aspect of the present invention is a content reception device that receives an edited content. The content reception device comprises: a memory unit stores therein a computer program composed of a combination of a plurality of computer instructions; and a processor that reads the computer instructions one by one from the computer program stored in the memory unit. The computer program causes a computer to execute: a reception step of sequentially receiving, as a content, the pieces of encrypted transfer data together with the respective nonce values; a decryption step of generating a key based on each of the received nonce values, and decrypting a corresponding one of the received pieces of encrypted transfer data with use of the generated key, thereby to obtain a plurality of pieces of transfer data; a judgment step of judging, with respect to each of the received nonce values, whether continuity or discontinuity exists between the received nonce value and a nonce value that has been immediately previously received; and a writing step of sequentially writing, as the content, the obtained pieces of transfer data into a recording medium, and when the judgment unit judges that discontinuity exists therebetween, writing, into the recording medium, information indicating that the received content contains a partial edited content.

A further another aspect of the present invention is a non-transitory computer-readable recording medium that has recorded therein a computer program for use in a content transmission device that edits an original content, which has been moved, to obtain an edited content, and moves the edited content back. The computer program causes a computer to execute: a division step of dividing each of the partial original content and the partial edited content to generate a plurality of pieces of transfer data; an encryption step of generating a nonce value with respect to each of the pieces of transfer data, such that (i) discontinuity exists between a nonce value generated with respect to one of the pieces of transfer data and a nonce value that has been immediately previously generated, the one piece of transfer data being generated immediately after a switch between the partial original content and the partial edited content, and (ii) continuity exists between a nonce value generated with respect to each of the pieces of transfer data excepting the one piece of transfer data and a nonce value that has been immediately previously generated, generating a key based on each of the generated nonce values, and encrypting a corresponding one of the pieces of transfer data with use of the generated key, thereby to obtain a plurality of pieces of encrypted transfer data; and a transmission step of transmitting the pieces of encrypted transfer data together with the respective nonce values in order of generation of the pieces of encrypted transfer data.

A further another aspect of the present invention is a non-transitory computer-readable recording medium that has recorded therein a computer program for use in a content reception device that receives an edited content. The computer program causes a computer to execute: a reception step of sequentially receiving, as a content, the pieces of encrypted transfer data together with the respective nonce values; a decryption step of generating a key based on each of the received nonce values, and decrypting a corresponding one of the received pieces of encrypted transfer data with use of the generated key, thereby to obtain a plurality of pieces of transfer data; a judgment step of judging, with respect to each of the received nonce values, whether continuity or discontinuity exists between the received nonce value and a nonce value that has been immediately previously received; and a writing step of sequentially writing, as the content, the obtained pieces of transfer data into a recording medium, and when the judgment unit judges that discontinuity exists therebetween, writing, into the recording medium, information indicating that the received content contains a partial edited content.

(9) The present invention may be any combination of the above embodiments and modification examples.

4. Summary

The present invention provides a content transmission device that records a stream of a copyright-protected content and accompanying information of the stream in an HDD, encrypts the content, and transmits the encrypted content to a device connected thereto via a network, the content transmission device comprising: an Nonce information generation unit operable to judge whether or not the stream of the content is a stream of an original content, and when judging negatively, generate Nonce information containing content attribute information whose value is discontinuous from a value of content attribute information that has been immediately previously generated; a stream encryption unit operable to read the stream from a stream storage device, encrypt the read stream, and combine the encrypted stream with a header containing the generated Nonce information, thereby to generate a packet containing the content attribute information; and an accompanying information recording unit operable to decrement the number of times indicated by copy count information contained in the accompanying information.

The present invention provides a content reception device that receives a stream of a content transmitted from a device connected thereto via a network, decrypts the received stream, records the decrypted stream in an HDD, generates or updates accompanying information of the stream, and records the generated or updated accompanying information in the HDD, the content reception device comprising: a stream analysis unit operable to divide each of packets of the received stream into data and a header, extract content attribute information from Nonce information contained in a header of the top packet, and judge the sameness between the received content and an original content based on whether continuity or discontinuity of values exists between the Nonce information contained in the header of the top packet and Nonce information that has been immediately previously acquired; and an accompanying information recording unit operable to increment the number of times indicated by copy count information contained in the accompanying information.

According to the content transmission device and the content reception device of the present invention, in the case where the content transmission device transmits a stream of a content, which is not the same as an original content, with conventional content transmission and reception methods, content attribute information whose value is discontinuous from a value of content attribute information that has been immediately previously acquired is stored in a header of the stream. This allows the content reception device to easily judge that the stream of the content transmitted from the content transmission device differs from a stream of the original content. Also, respective keys for encrypting and decrypting the content are generated based on the Nonce information. Accordingly, even if Nonce information is tampered with by a third party for example, it is impossible to properly decrypt the content. This further enhances the content protection.

Also, the present invention provides a content transmission device that records a stream of a copyright-protected content and accompanying information of the stream in an HDD, encrypts the content, and transmits the encrypted content to a device connected thereto via a network, the content transmission device comprising: a stream storage unit operable to store therein the stream of the content; an accompanying information storage unit operable to store therein arbitrary accompanying information set with respect to the stream; an edited section information generation unit operable to generate accompanying information with respect to a new stream obtained by performing edition or insertion on the stream of the content; an Nonce information generation unit operable to judge whether or not the stream of the content is a stream of an original content, and when judging negatively, generate Nonce information containing content attribute information that is discontinuous from content attribute information that has been immediately previously generated; a stream encryption unit operable to read the stream from a stream storage device, encrypt the read stream, and combine the encrypted stream with a header containing the generated Nonce information, thereby to generate a packet containing the content attribute information; and an accompanying information recording unit operable to decrement the number of times indicated by copy count information contained in the accompanying information; and a communication I/F unit operable to physically transmit the stream to the device connected with the content transmission device via the network.

Here, the Nonce information containing the content attribute information may be stored in a Nonce area of a header information contained in the transmitted stream.

Here, information stored in a reserved area of PCP-UR contained in the Nonce information may contain a type flag, a content identifier, content control information, and content copy count information.

Here, the content transmission device may judge whether each stream section is whether a stream section contained in a moved content or an edited stream section, with use of the content identifier contained in the Nonce information.

Here, the content transmission device may easily separate streams composed of a mix of a stream of a moved content and an added stream by edition, by making a Nonce of the stream of a moved content and the added stream to be discontinuous.

Also, the present invention provides a content reception device that receives a stream of a content transmitted from a device connected thereto via a network, decrypts the stream, records the decrypted stream in an HDD, generates or update accompanying information of the stream, and records the generated or updated accompanying information in the HDD, the content reception device comprising: a communication I/F unit operable to receive the stream from the device connected with the content reception device via the network; a stream storage unit operable to store therein the stream data of the stream; a stream analysis unit operable to divide each of packets of the received stream into data and a header, extract content attribute information from Nonce information contained in a header of the top packet, and judge the sameness between the received content and an original content based on whether continuity or discontinuity of values exists between the Nonce information contained in the header of the top packet and Nonce information that has been immediately previously acquired; and an accompanying information recording unit operable to increment the number of times indicated by copy count information contained in the accompanying information.

Here, the Nonce information containing the content attribute information may be stored in a Nonce area of a header of each packet of the received stream.

Here, the stream analysis unit may judge whether the received stream is a moved content or a stream of a content added by edition, based on a type flag stored in the reserved area of Nonce information contained in a header of each packet of the received stream.

Here, the stream analysis unit may easily judge whether each stream section is a stream section of an edited content or a stream section of a moved content, by judging whether continuity of values exists between Nonce information of a currently received stream and Nonce information that has been immediately previously acquired.

Here, the stream analysis unit may control decoding and recording of the stream based on content control information stored in a reserved area of the Nonce information.

INDUSTRIAL APPLICABILITY

According to the content transmission device and the content reception device of the present invention, in the case where the content transmission device transmits a stream of a content, which is not an original content, with conventional content transmission and reception methods, pieces of Nonce information whose values are discontinuous are stored in respective headers of the stream. This allows the content reception device to easily judge that the stream of the content transmitted from the content transmission device differs from a stream of the original content. Accordingly, the present invention is useful in an art of, between devices connected to a network, moving a content composed of video, audio, and so on from an origination device to a destination device, and moving the content which has been edited by the destination device back to the origination device.

REFERENCE SIGNS LIST 60 content transmission device
61 storage unit
62 division unit
63 encryption unit
64 transmission unit
70 content reception device
71 reception unit
72 decryption unit
73 writing unit
74 judgment unit
75 recording medium
80 content transmission/reception system
10 and 20 content storing device
30 display device
40 local network
50 content transmission/reception system
100 content storing device
101 channel selection unit
102 demultiplexer
103 recording control unit
104 transmission control unit
105 stream encryption unit
106 Nonce information generation unit
107 stream decryption unit
108 stream analysis unit
109 authentication unit
111 communication IF unit
112 stream storage unit
113 accompanying information storage unit
114 user IF unit
121 accompanying information management unit
122 playback control unit
123 stream decoding unit
124 AV output unit
125 edition control unit
126 section information generation unit

The invention claimed is:

1. A content transmission/reception system that includes a content transmission device and a content reception device,
the content transmission device comprising:
a storage unit operable to store therein an edited content composed of a partial original content and a partial edited content, the partial original content being a part of an original content, the partial edited content being a part obtained by editing a part of the original content;
a division unit operable to divide each of the partial original content and the partial edited content to generate a plurality of pieces of transfer data;
an encryption unit operable to
generate a nonce value with respect to each of the pieces of transfer data, such that (i) discontinuity exists between a nonce value generated with respect to one of the pieces of transfer data and a nonce value that has been immediately previously generated, the one piece of transfer data being generated immediately after a switch between the partial original content and the partial edited content, and (ii) continuity exists between a nonce value generated with respect to each of the pieces of transfer data excepting the one piece of transfer data and a nonce value that has been immediately previously generated,
generate a key based on each of the generated nonce values, and
encrypt a corresponding one of the pieces of transfer data with use of the generated key, thereby to obtain a plurality of pieces of encrypted transfer data; and
a transmission unit operable to transmit the pieces of encrypted transfer data together with the respective nonce values in order of generation of the pieces of encrypted transfer data, and
the content reception device comprising:
a reception unit operable to sequentially receive, as a content, the pieces of encrypted transfer data together with the respective nonce values;
a decryption unit operable to generate a key based on each of the received nonce values, and decrypt a corresponding one of the received pieces of encrypted transfer data with use of the generated key, thereby to obtain a plurality of pieces of transfer data;
a judgment unit operable to judge, with respect to each of the received nonce values, whether continuity or discontinuity exists between the received nonce value and a nonce value that has been immediately previously received; and a writing unit operable to sequentially write, as the content, the obtained pieces of transfer data into a recording medium, and when the judgment unit judges that discontinuity exists therebetween, write, into the recording medium, information indicating that the received content contains a partial edited content.

2. The content transmission/reception system of claim 1, wherein the encryption unit generates a random value as the nonce value with respect to the one piece of transfer data generated immediately after the switch.

3. The content transmission/reception system of claim 2, wherein the encryption unit generates the nonce value with respect to the one piece of transfer data generated immediately after the switch, such that a difference between the generated nonce value and the immediately previously generated nonce value is greater than a threshold, and with respect to each of the received nonce values, if a difference between the received nonce value and a nonce value that has been immediately previously received is greater than the threshold, the judgment unit judges that discontinuity exists therebetween.

4. A content transmission device that edits an original content which has been moved to obtain an edited content, and moves the edited content back, the content transmission device comprising:

a storage unit operable to store therein an edited content composed of a partial original content and a partial edited content, the partial original content being a part of an original content, the partial edited content being a part obtained by editing a part of the original content;

a division unit operable to divide each of the partial original content and the partial edited content to generate a plurality of pieces of transfer data;

an encryption unit operable to
generate a nonce value with respect to each of the pieces of transfer data, such that (i) discontinuity exists between a nonce value generated with respect to one of the pieces of transfer data and a nonce value that has been immediately previously generated, the one piece of transfer data being generated immediately after a switch between the partial original content and the partial edited content, and (ii) continuity exists between a nonce value generated with respect to each of the pieces of transfer data excepting the one piece of transfer data and a nonce value that has been immediately previously generated, generate a key based on each of the generated nonce values, and encrypt a corresponding one of the pieces of transfer data with use of the generated key, thereby to obtain a plurality of pieces of encrypted transfer data; and a transmission unit operable to transmit the pieces of encrypted transfer data together with the respective nonce values in order of generation of the pieces of encrypted transfer data.

5. The content transmission device of claim 4, wherein the encryption unit generates a random value as the nonce value with respect to the one piece of transfer data generated immediately after the switch.

6. The content transmission device of claim 5, wherein the encryption unit generates the nonce value with respect to the one piece of transfer data generated immediately after the switch, such that a difference between the generated nonce value and the immediately previously generated nonce value is greater than a threshold, and the threshold is used for judging whether continuity or discontinuity exists between each of the generated nonce values and a nonce value that has been immediately previously generated.

7. The content transmission device of claim 5, wherein the encryption unit generates the nonce value with respect to the one piece of transfer data generated immediately after the switch, such that a difference between the generated nonce value and the immediately previously generated nonce value is equal to or greater than a second threshold, the second threshold is greater than a first threshold, and is used for judging that discontinuity exists between each of the generated nonce values and a nonce value that has been immediately previously generated, and the first threshold is used for judging that continuity exists therebetween.

8. A content reception device that receives edited content from a content transmission device, the content transmission device comprising:

a storage unit operable to store therein an edited content composed of a partial original content and a partial edited content, the partial original content being a part of an original content, the partial edited content being a part obtained by editing a part of the original content;

a division unit operable to divide each of the partial original content and the partial edited content to generate a plurality of pieces of transfer data;

an encryption unit operable to
generate a nonce value with respect to each of the pieces of transfer data, such that (i) discontinuity exists between a nonce value generated with respect to one of the pieces of transfer data and a nonce value that has been immediately previously generated, the one piece of transfer data being generated immediately after a switch between the partial original content and the partial edited content, and (ii) continuity exists between a nonce value generated with respect to each of the pieces of transfer data excepting the one piece of transfer data and a nonce value that has been immediately previously generated, generate a key based on each of the generated nonce values, and encrypt a corresponding one of the pieces of transfer data with use of the generated key, thereby to obtain a plurality of pieces of encrypted transfer data; and a transmission unit operable to transmit the pieces of encrypted transfer data together with the respective nonce values in order of generation of the pieces of encrypted transfer data, the content reception device comprising:

a reception unit operable to sequentially receive, as a content, the pieces of encrypted transfer data together with the respective nonce values;

a decryption unit operable to generate a key based on each of the received nonce values, and decrypt a corresponding one of the received pieces of encrypted transfer data with use of the generated key, thereby to obtain a plurality of pieces of transfer data;

a judgment unit operable to judge, with respect to each of the received nonce values, whether continuity or discontinuity exists between the received nonce value and a nonce value that has been immediately previously received; and a writing unit operable to sequentially write, as the content, the obtained pieces of transfer data into a recording medium, and when the judgment unit judges that discontinuity exists therebetween, write, into the recording medium, information indicating that the received content contains a partial edited content.

9. The content reception device of claim 8, wherein
with respect to each of the received nonce values, if a difference between the received nonce value and a nonce value that has been immediately previously received is greater than a threshold, the judgment unit judges that discontinuity exists therebetween.

10. The content reception device of claim 8, wherein
with respect to each of the received nonce values, when a difference between the received nonce value and a nonce value that has been immediately previously received is equal to or greater than a second threshold, the judgment unit judges that discontinuity exist therebetween,
when the difference is equal to or less than a first threshold, the judgment unit judges that continuity exists therebetween, and
the second threshold is greater than the first threshold.

11. The content reception device of claim 8, wherein
when the judgment unit judges that the discontinuity exists, the writing unit further writes into the recording medium, as a point of the switch between the partial original content and the partial edited content, a position in the received content where the one piece of transfer data generated immediately after the switch is located.

12. A content transmission method for use in a content transmission device, the content transmission device editing an original content which has been moved to obtain an edited content and moving the edited content back, and including a storage unit operable to store therein the edited content composed of a partial original content that is a part of an original content and a partial edited content that is a part obtained by editing a part of the original content, the content transmission method comprising:
a division step of dividing each of the partial original content and the partial edited content to generate a plurality of pieces of transfer data;
an encryption step of
generating a nonce value with respect to each of the pieces of transfer data, such that (i) discontinuity exists between a nonce value generated with respect to one of the pieces of transfer data and a nonce value that has been immediately previously generated, the one piece of transfer data being generated immediately after a switch between the partial original content and the partial edited content, and (ii) continuity exists between a nonce value generated with respect to each of the pieces of transfer data excepting the one piece of transfer data and a nonce value that has been immediately previously generated,
generating a key based on each of the generated nonce values, and
encrypting a corresponding one of the pieces of transfer data with use of the generated key, thereby to obtain a plurality of pieces of encrypted transfer data; and
a transmission step of transmitting the pieces of encrypted transfer data together with the respective nonce values in order of generation of the pieces of encrypted transfer data.

13. A content reception method for use in a content reception device that receives edited content from a content transmission device, the content transmission device comprising:
a storage unit operable to store therein an edited content composed of a partial original content and a partial edited content, the partial original content being a part of an original content, the partial edited content being a part obtained by editing a part of the original content;
a division unit operable to divide each of the partial original content and the partial edited content to generate a plurality of pieces of transfer data;
an encryption unit operable to
generate a nonce value with respect to each of the pieces of transfer data, such that (i) discontinuity exists between a nonce value generated with respect to one of the pieces of transfer data and a nonce value that has been immediately previously generated, the one piece of transfer data being generated immediately after a switch between the partial original content and the partial edited content, and (ii) continuity exists between a nonce value generated with respect to each of the pieces of transfer data excepting the one piece of transfer data and a nonce value that has been immediately previously generated,
generate a key based on each of the generated nonce values, and
encrypt a corresponding one of the pieces of transfer data with use of the generated key, thereby to obtain a plurality of pieces of encrypted transfer data; and
a transmission unit operable to transmit the pieces of encrypted transfer data together with the respective nonce values in order of generation of the pieces of encrypted transfer data,
the content reception method comprising:
a reception step of sequentially receiving, as a content, the pieces of encrypted transfer data together with the respective nonce values;
a decryption step of generating a key based on each of the received nonce values, and decrypting a corresponding one of the received pieces of encrypted transfer data with use of the generated key, thereby to obtain a plurality of pieces of transfer data;
a judgment step of judging, with respect to each of the received nonce values, whether continuity or discontinuity exists between the received nonce value and a nonce value that has been immediately previously received; and
a writing step of sequentially writing, as the content, the obtained pieces of transfer data into a recording medium, and when the judgment unit judges that discontinuity exists therebetween, writing, into the recording medium, information indicating that the received content contains a partial edited content.

14. A non-transitory computer-readable recording medium that has recorded therein a computer program for content transmission for use in a content transmission device, the content transmission device editing an original content which has been moved to obtain an edited content and moving the edited content back, and including a storage unit operable to store therein the edited content composed of a partial original content that is a part of an original content and a partial edited content that is a part obtained by editing a part of the original content, the computer program causing a computer to execute:
a division step of dividing each of the partial original content and the partial edited content to generate a plurality of pieces of transfer data;
an encryption step of
generating a nonce value with respect to each of the pieces of transfer data, such that (i) discontinuity exists between a nonce value generated with respect to one of the pieces of transfer data and a nonce value that has been immediately previously generated, the one piece of transfer data being generated immediately after a switch between the partial original content and the partial edited content, and (ii) continuity exists between a nonce value generated with respect to each of the pieces of transfer data excepting the one piece of transfer data and a nonce value that has been immediately previously generated, generating a key based on each of the generated nonce values, and encrypting a corresponding one of the pieces of transfer data with use of the generated key, thereby to obtain a plurality of pieces of encrypted transfer data; and a transmission step of transmitting the pieces of encrypted transfer data together with the respective nonce values in order of generation of the pieces of encrypted transfer data.

15. A non-transitory computer-readable recording medium that has recorded therein a computer program for content reception for use in a content reception device that receives edited content from a content transmission device, the content transmission device comprising:

a storage unit operable to store therein an edited content composed of a partial original content and a partial edited content, the partial original content being a part of an original content, the partial edited content being a part obtained by editing a part of the original content;

a division unit operable to divide each of the partial original content and the partial edited content to generate a plurality of pieces of transfer data;

an encryption unit operable to generate a nonce value with respect to each of the pieces of transfer data, such that (i) discontinuity exists between a nonce value generated with respect to one of the pieces of transfer data and a nonce value that has been immediately previously generated, the one piece of transfer data being generated immediately after a switch between the partial original content and the partial edited content, and (ii) continuity exists between a nonce value generated with respect to each of the pieces of transfer data excepting the one piece of transfer data and a nonce value that has been immediately previously generated, generate a key based on each of the generated nonce values, and encrypt a corresponding one of the pieces of transfer data with use of the generated key, thereby to obtain a plurality of pieces of encrypted transfer data; and a transmission unit operable to transmit the pieces of encrypted transfer data together with the respective nonce values in order of generation of the pieces of encrypted transfer data, the computer program causing a computer to execute:

a reception step of sequentially receiving, as a content, the pieces of encrypted transfer data together with the respective nonce values;

a decryption step of generating a key based on each of the received nonce values, and decrypting a corresponding one of the received pieces of encrypted transfer data with use of the generated key, thereby to obtain a plurality of pieces of transfer data;

a judgment step of judging, with respect to each of the received nonce values, whether continuity or discontinuity exists between the received nonce value and a nonce value that has been immediately previously received; and a writing step of sequentially writing, as the content, the obtained pieces of transfer data into a recording medium, and when the judgment unit judges that discontinuity exists therebetween, writing, into the recording medium, information indicating that the received content contains a partial edited content.

16. An integrated circuit that constitutes a content transmission device that edits an original content which has been moved to obtain an edited content, and moves the edited content back, the integrated circuit comprising:

a storage unit operable to store therein an edited content composed of a partial original content and a partial edited content, the partial original content being a part of an original content, the partial edited content being a part obtained by editing a part of the original content;

a division unit operable to divide each of the partial original content and the partial edited content to generate a plurality of pieces of transfer data;

an encryption unit operable to generate a nonce value with respect to each of the pieces of transfer data, such that (i) discontinuity exists between a nonce value generated with respect to one of the pieces of transfer data and a nonce value that has been immediately previously generated, the one piece of transfer data being generated immediately after a switch between the partial original content and the partial edited content, and (ii) continuity exists between a nonce value generated with respect to each of the pieces of transfer data excepting the one piece of transfer data and a nonce value that has been immediately previously generated, generate a key based on each of the generated nonce values, and encrypt a corresponding one of the pieces of transfer data with use of the generated key, thereby to obtain a plurality of pieces of encrypted transfer data; and a transmission unit operable to transmit the pieces of encrypted transfer data together with the respective nonce values in order of generation of the pieces of encrypted transfer data.

17. An integrated circuit that constitutes a content reception device that receives edited content from a content transmission device, the content transmission device comprising:

a storage unit operable to store therein an edited content composed of a partial original content and a partial edited content, the partial original content being a part of an original content, the partial edited content being a part obtained by editing a part of the original content;

a division unit operable to divide each of the partial original content and the partial edited content to generate a plurality of pieces of transfer data;

an encryption unit operable to generate a nonce value with respect to each of the pieces of transfer data, such that (i) discontinuity exists between a nonce value generated with respect to one of the pieces of transfer data and a nonce value that has been immediately previously generated, the one piece of transfer data being generated immediately after a switch between the partial original content and the partial edited content, and (ii) continuity exists between a nonce value generated with respect to each of the pieces of transfer data excepting the one piece of transfer data and a nonce value that has been immediately previously generated, generate a key based on each of the generated nonce values, and encrypt a corresponding one of the pieces of transfer data with use of the generated key, thereby to obtain a plurality of pieces of encrypted transfer data; and a transmission unit operable to transmit the pieces of encrypted transfer data together with the respective nonce values in order of generation of the pieces of encrypted transfer data, the integrated circuit comprising:

a reception unit operable to sequentially receive, as a content, the pieces of encrypted transfer data together with the respective nonce values;

a decryption unit operable to generate a key based on each of the received nonce values, and decrypt a corresponding one of the received pieces of encrypted transfer data with use of the generated key, thereby to obtain a plurality of pieces of transfer data;

a judgment unit operable to judge, with respect to each of the received nonce values, whether continuity or discontinuity exists between the received nonce value and a nonce value that has been immediately previously received; and a writing unit operable to sequentially write, as the content, the obtained pieces of transfer data into a recording medium, and when the judgment unit judges that discontinuity exists therebetween, write, into the recording medium, information indicating that the received content contains a partial edited content.

* * * * *